(12) United States Patent
Tada

(10) Patent No.: US 10,889,163 B2
(45) Date of Patent: Jan. 12, 2021

(54) HEAT PUMP SYSTEM

(71) Applicant: DENSO CORPORATION, Kariya (JP)

(72) Inventor: Kazuhiro Tada, Kariya (JP)

(73) Assignee: DENSO CORPORATION, Kariya (JP)

( * ) Notice: Subject to any disclaimer, the term of this patent is extended or adjusted under 35 U.S.C. 154(b) by 162 days.

(21) Appl. No.: 16/071,917

(22) PCT Filed: Jan. 20, 2017

(86) PCT No.: PCT/JP2017/001836
§ 371 (c)(1),
(2) Date: Jul. 23, 2018

(87) PCT Pub. No.: WO2017/130845
PCT Pub. Date: Aug. 3, 2017

(65) Prior Publication Data
US 2019/0030992 A1    Jan. 31, 2019

(30) Foreign Application Priority Data

Jan. 25, 2016   (JP) .................................. 2016-011531
Dec. 5, 2016    (JP) .................................. 2016-236054

(51) Int. Cl.
*B60H 1/22*    (2006.01)
*B60H 1/00*    (2006.01)
(Continued)

(52) U.S. Cl.
CPC .......... *B60H 1/22* (2013.01); *B60H 1/00899* (2013.01); *B60H 1/00921* (2013.01);
(Continued)

(58) Field of Classification Search
CPC .. B60H 1/22; B60H 1/00899; B60H 1/00921; B60H 1/321; B60H 2001/00961;
(Continued)

(56) References Cited

U.S. PATENT DOCUMENTS 5,544,493 A    8/1996   Suzuki et al.
5,664,429 A    9/1997   Isaji
(Continued)

FOREIGN PATENT DOCUMENTS

JP    H07186710 A    7/1995
JP    2002162108 A   6/2002
(Continued)

*Primary Examiner* — Edward F Landrum
*Assistant Examiner* — Joanna H Rosario
(74) *Attorney, Agent, or Firm* — Harness, Dickey & Pierce, P.L.C.

(57) ABSTRACT

A heat pump system includes a heat pump cycle, a heat medium circulation circuit, and a refrigeration cycle device. The refrigeration cycle device is configured to perform a defrosting operation when a frost formation determiner determines that frost is formed. A throttle opening degree controller is configured to increase an opening degree in the defrosting operation. A pumping capacity controller is configured to increase a pumping capacity in the defrosting operation with increase of a required heating capacity required for heating a heating target fluid, the pumping capacity controller increasing the pumping capacity such that heat of refrigerant discharged from a compressor is transferred to heat medium in a first heat exchanger within a range in which a temperature of the refrigerant flowing into an outside heat exchanger is capable of melting the frost formed on the outside heat exchanger.

4 Claims, 9 Drawing Sheets

(51) Int. Cl.
*F25B 40/04* (2006.01)
*F25B 5/04* (2006.01)
*F25B 30/02* (2006.01)
*F24F 11/84* (2018.01)
*B60H 1/32* (2006.01)
*F25B 47/02* (2006.01)

(52) U.S. Cl.
CPC .............. *B60H 1/321* (2013.01); *F24F 11/84* (2018.01); *F25B 5/04* (2013.01); *F25B 30/02* (2013.01); *F25B 40/04* (2013.01); *F25B 47/02* (2013.01); *B60H 2001/00949* (2013.01); *B60H 2001/00961* (2019.05); *F25B 2400/0409* (2013.01); *F25B 2400/0411* (2013.01); *F25B 2600/02* (2013.01); *F25B 2600/13* (2013.01); *F25B 2600/2501* (2013.01); *F25B 2600/2513* (2013.01)

(58) Field of Classification Search
CPC ....... B60H 2001/00949; B60H 1/00949; F24F 11/84; F25B 5/04; F25B 30/02; F25B 40/04; F25B 47/02; F25B 2400/0409; F25B 2400/0411; F25B 2600/02; F25B 2600/13; F25B 2600/2501; F25B 2600/2513; F25B 2700/11
USPC .......................................................... 62/156
See application file for complete search history.

(56) References Cited

U.S. PATENT DOCUMENTS

| | | | |
|---|---|---|---|
| 8,973,387 | B2 * | 3/2015 | Osaka ................ B60H 1/00021 62/244 |
| 9,925,877 | B2 * | 3/2018 | Miyakoshi .............. B60L 58/12 |
| 2003/0200763 | A1 | 10/2003 | Takeuchi |
| 2013/0081419 | A1 | 4/2013 | Katoh et al. |

FOREIGN PATENT DOCUMENTS

| | | |
|---|---|---|
| JP | 2003320838 A | 11/2003 |
| JP | 2007024470 A | 2/2007 |
| JP | 4631576 B2 | 2/2011 |
| JP | 2012017092 A | 1/2012 |
| JP | 2014228261 A | 12/2014 |
| JP | 2015033953 A | 2/2015 |

* cited by examiner

HEAT PUMP SYSTEM

CROSS REFERENCE TO RELATED APPLICATIONS

This application is a U.S. National Phase Application under 35 U.S.C. 371 of International Application No. PCT/JP2017/001836 filed on Jan. 20, 2017 and published in Japanese as WO 2017/130845 A1 on Aug. 3, 2017. This application is based on and claims the benefit of priority from Japanese Patent Applications No. 2016-011531 filed on Jan. 25, 2016, and No. 2016-236054 filed on Dec. 5, 2016. The entire disclosures of all of the above applications are incorporated herein by reference.

TECHNICAL FIELD

The present disclosure relates to a heat pump system that heats a heat medium by a heat pump cycle and heats a heating target fluid by using the heated heat medium as a heat source.

BACKGROUND ART

Conventionally, Patent Document 1 discloses a heat pump system which heats hot water that is a heat medium by a heat pump cycle (i.e. a vapor compression type refrigeration cycle) and exchanges heat between heated hot water and blown air that is a heating target fluid.

The heat pump system of Patent Document 1 performs a defrosting operation to remove frost when frost is formed on an outside heat exchanger functioning as an evaporator of the heat pump cycle. Specifically, the heat pump system of Patent Document 1 performs a so-called hot-gas defrosting in which an opening degree of an expansion valve of the heat pump cycle is increased in the defrosting operation to remove the frost by increasing the temperature of the refrigerant flowing into the outside heat exchanger.

PRIOR ART DOCUMENT

Patent Document

Patent Document 1: JP 4631576 B2

SUMMARY OF THE INVENTION

In the heat pump system of Patent Document 1, on the premise that the temperature of the hot water is equal to or higher than a predetermined temperature during the defrosting operation, the opening degree of the expansion valve is adjusted such that the temperature of a refrigerant flowing out of a water-refrigerant heat exchanger exchanging heat between a high-pressure refrigerant and the hot water becomes the temperature of the hot water.

According to study of the inventor of the present disclosure, in the heat pump system of the Patent Document 1, a defrosting capacity for defrosting the outside heat exchanger is changed when the temperature of the hot water changes, and accordingly the heat pump system may not perform a stable defrosting. For example, when the temperature of hot water is decreased, the defrosting time may be prolonged. Furthermore, if the temperature of the hot water is low, the heating capacity of the blown air may become insufficient.

In consideration of the above-described points, it is an objective of the present disclosure to provide a heat pump system capable of suppressing a decrease in heating capacity for heating a heating target fluid while exhibiting a stable defrosting capacity during a defrosting operation.

A heat pump system according to an aspect of the present disclosure includes a heat pump cycle, a heat medium circulation cycle, and a refrigeration cycle device. The heat pump cycle includes a compressor configured to compress and discharge refrigerant, a first heat exchanger configured to exchange heat between high-pressure refrigerant discharged from the compressor and heat medium, a decompressor configured to decompress the refrigerant flowing out of the first heat exchanger, and an outside heat exchanger configured to exchange heat between low-pressure refrigerant decompressed by the decompressor and outside air. The heat medium circulation circuit includes a pumping device configured to pump the heat medium, and a second heat exchanger configured to heat heating target fluid by exchanging heat between the heat medium flowing out of the first heat exchanger and the heating target fluid. The refrigeration cycle device includes a throttle opening degree controller configured to control an opening degree of the decompressor, a pumping capacity controller configured to control a pumping capacity of the pumping device, and a frost formation determiner configured to determine whether frost is formed on the outside heat exchanger. The refrigeration cycle device is configured to perform a defrosting operation to defrost the outside heat exchanger when the frost formation determiner determines that frost is formed on the outside heat exchanger. The throttle opening degree controller is configured to increase the opening degree in the defrosting operation. The pumping capacity controller is configured to increase the pumping capacity in the defrosting operation with increase of a required heating capacity required for heating the heating target fluid, the pumping capacity controller increasing the pumping capacity within a range in which a temperature of the refrigerant flowing into the outside heat exchanger is capable of melting the frost formed on the outside heat exchanger.

According to this, since the throttle opening degree controller increases the opening degree of the decompressor, the defrosting of the outside heat exchanger can be performed by increasing the temperature of the refrigerant flowing into the outside heat exchanger.

At this time, since the pumping capacity controller increases the pumping capacity with increase of the required heating capacity, it is possible to prevent the refrigerant from dissipating heat required for defrosting by the first heat exchanger. Further, it is possible to suppress the temperature decrease of the heat medium flowing out of the first heat exchanger and to supply the heat medium at a relatively high temperature to the second heat exchanger.

That is, according to this aspect, it is possible to provide a heat pump system capable of suppressing a decrease in heating capacity for heating heating target fluid while exhibiting a stable defrosting capacity during a defrosting operation.

Here, the frost formation determiner described in claims is not limited to a determiner that determines whether frost is actually formed on the outside heat exchanger. For example, a determiner configured to determine whether the operation condition may cause frost formation on the outside heat exchanger, and a determiner configured to determine whether there is a possibility of frost formation on the outside heat exchanger are also included in the meaning of the term "frost formation determiner".

EMBODIMENTS FOR EXPLOITATION OF THE INVENTION

Figure 1:
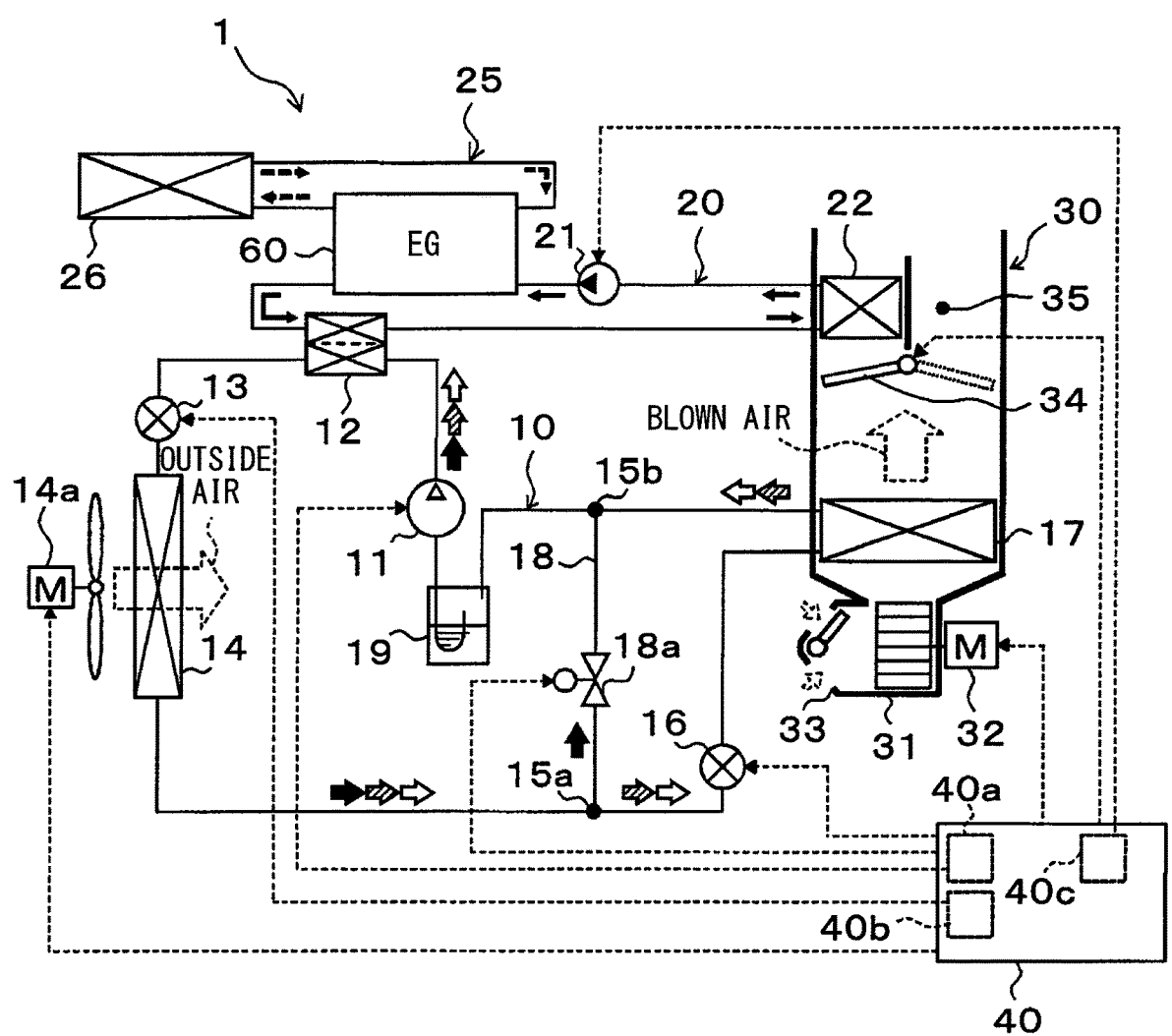
FIG. 1 is a schematic diagram illustrating an overall structure of a heat pump system of a first embodiment.

Hereinafter, embodiments for implementing the present disclosure will be described referring to drawings. In each embodiment, portions corresponding to the elements described in the preceding embodiments are denoted by the same reference numerals, and redundant explanation may be omitted. In each of the embodiments, when only a part of the configuration is described, the other parts of the configuration can be applied to the other embodiments described above. The present disclosure is not limited to combinations of embodiments which combine parts that are explicitly described as being combinable. As long as no problems are present, the various embodiments may be partially combined with each other even if not explicitly described.

First Embodiment

Hereinafter, a first embodiment of the present disclosure will be described with reference to FIGS. 1 to 7. In the present embodiment, a heat pump system 1 of the present disclosure is applied to an air-conditioning device for a hybrid vehicle which obtains a driving force for vehicle traveling from both of an internal combustion engine (engine) 60 and a traveling electric motor. The heat pump system 1 of an air-conditioner for vehicle performs a function of heating or cooling blown air blown into a vehicle compartment which is an air-conditioning target space.

The heat pump system 1 includes a heat pump cycle 10, which is a vapor compression type refrigeration cycle for heating or cooling the blown air, and a heat medium circulation circuit 20 in which cooling water of the engine 60 circulates. When the blown air is heated, the heat pump system 1 is capable of heating the cooling water by the heat pump cycle 10 and heating the blown air by using the heated cooling water as a heat source. Therefore, in the heat pump system 1 of the present embodiment, the heating target fluid is the blown air, and the heat medium is the cooling water.

Furthermore, the heat pump cycle 10 is configured to switch the refrigerant circuit. Specifically, the heat pump cycle 10 is configured to switch between: a refrigerant circuit for a cooling operation for cooling the vehicle compartment by cooling the blown air; a refrigerant circuit for heating operation for heating the vehicle compartment by heating the blown air; and a refrigerant circuit for dehumidifying-heating operation in which the blown air that has been cooled and dehumidified is reheated so as to perform dehumidification and heating of the vehicle compartment.

In FIG. 1, a flow of the refrigerant in the refrigerant circuit for the cooling operation is indicated by outlined arrows. A flow of the refrigerant in the refrigerant circuit for the heating operation is indicated by black arrows. A flow of refrigerant in the refrigerant circuit for the dehumidifying-heating operation is indicated by arrows hatched with diagonal lines. Furthermore, in addition to the cooling operation, the heating operation, and the dehumidifying-heating operation, the heat pump cycle 10 is configured to perform a defrosting operation for removing frost when the frost is formed on an outside heat exchanger 14 described later.

Further, in the heat pump cycle 10 of the present embodiment, an HFC-based refrigerant (specifically, R134a) is adopted as the refrigerant, and a subcritical refrigeration cycle in which the high-pressure-side refrigerant pressure does not exceed the critical pressure of the refrigerant is constituted. Refrigerating machine oil for lubricating a compressor 11 is mixed in the refrigerant, and a part of the refrigerating machine oil circulates in the cycle together with the refrigerant.

The compressor 11 constituting the heat pump cycle 10 is disposed in the engine room. The compressor 11 takes in the refrigerant in the heat pump cycle 10, compresses the refrigerant to be high pressure refrigerant, and discharges the refrigerant. Specifically, the compressor 11 of the present embodiment is an electric compressor that houses a fixed displacement type compression mechanism and an electric motor that drives the compression mechanism in one housing.

Various compression mechanisms such as a scroll type compression mechanism and a vane type compression mechanism may be adopted as the compression mechanism. In addition, the operation (rotational speed) of the electric motor is controlled by a control signal output from an air-conditioning controller 40, which will be described later, and either an AC motor or a DC motor may be adopted as the electric motor.

A refrigerant inlet side of a water-refrigerant heat exchanger 12 is connected to a discharge port of the compressor 11. The water-refrigerant heat exchanger 12 is a first heat exchanger for exchanging heat between the high-pressure refrigerant discharged from the compressor 11 and the cooling water circulating through the heat medium circulation circuit 20.

A heat exchanger that includes multiple tubes, water passages, and inner fins can be adopted as the water-refrigerant heat exchanger 12. The tubes define refrigerant passages through which the high-pressure refrigerant flows. Water passages through which the cooling water flows are defined between adjacent tubes. The inner fins are provided in the water passages and enhance the heat exchange between the refrigerant and the cooling water.

An outlet side of the water-refrigerant heat exchanger 12 is connected to an inlet side of a heating expansion valve 13. The heating expansion valve 13 is a decompressor for reducing the pressure of the high-pressure refrigerant flowing out of the water-refrigerant heat exchanger 12 during a heating operation, for example. More specifically, the heating expansion valve 13 is an electric and variable throttle mechanism which includes a valve body configured to change an opening degree and an electric actuator including a stepper motor configured to change the opening degree by moving the valve body.

The heating expansion valve 13 of the present embodiment is a variable throttle mechanism with a fully open function. The heating expansion valve 13 functions as a simple refrigerant passageway without exerting almost any refrigerant depressurizing action when the throttle opening degree is set to be a fully open condition. The operation of the heating expansion valve 13 is controlled by a control signal output from the air-conditioning controller 40.

An outlet side of the heating expansion valve 13 is connected to a refrigerant inlet side of the outside heat exchanger 14. The outside heat exchanger 14 is disposed on a front side in the engine room and exchanges heat between the refrigerant on the downstream side of the water-refrigerant heat exchanger 12 and outside air blown from a blower fan 14a.

The outside heat exchanger 14 functions as a radiator that releases heat of the high-pressure refrigerant at least in the cooling operation, and functions as an evaporator that evaporates the low-pressure refrigerant decompressed by the heating expansion valve 13 such that the low-pressure refrigerant exerts a heat absorption effect at least in the heating operation. The blowing fan 14a is an electric blower whose availability i.e. rotational speed (a blowing capacity) is controlled by a control voltage output from the air-conditioning controller 40.

A refrigerant inlet of a branch portion 15a that separates the flow of the refrigerant flowing out of the outside heat exchanger 14 is connected to a refrigerant outlet side of the outside heat exchanger 14. The branch portion 15a is a three-way joint, and one of the three inlet and outlets is a coolant inflow port, and the remaining two are coolant outflow ports. The three-way joint may be formed by joining pipes having different pipe diameters, or by forming coolant passages in a metal block or a resin block.

One refrigerant outlet side of the branch portion 15a is connected to a refrigerant inlet side of a cooling expansion valve 16. The other refrigerant outlet side of the branch portion 15a is connected to a bypass passage 18 that guides the refrigerant flowing out of the branch portion 15a toward an inlet of an accumulator described later such that the refrigerant bypasses the cooling expansion valve 16, for example.

The basic structure of the cooling expansion valve 16 is the same as that of the heating expansion valve 13. Furthermore, the cooling expansion valve 16 according to the present embodiment is a variable throttle mechanism which has a fully close function to close the refrigerant passage, in addition to the fully open function to fully open the refrigerant passage extending from the refrigerant outlet side of the outside heat exchanger 14 to the refrigerant inlet side of the inside evaporator 17.

The heat pump cycle 10 of the present embodiment is capable of switching the refrigerant circuit, in which the refrigerant circulates, by closing the refrigerant passage by the cooling expansion valve 16. Therefore, the cooling expansion valve 16 of the present embodiment also functions as a refrigerant circuit switching device.

An outlet side of the cooling expansion valve 16 is connected to a refrigerant inlet side of the inside evaporator 17. The inside evaporator 17 is disposed in a casing 31 of a inside air-conditioning unit 30 described later. The inside evaporator 17 is a cooling heat exchanger for cooling the blown air by evaporating the refrigerant flowing therethrough by heat exchange between the blown air and the refrigerant at least in the cooling operation and the dehumidifying-heating operation.

An inlet side of an accumulator 19 is connected to a refrigerant outlet side of the inside evaporator 17 via a joint portion 15b. The accumulator 19 is a gas-liquid separator that separates liquid from gas of the refrigerant flowing into the accumulator 19 and stores the surplus liquid-phase refrigerant in the cycle. The joint portion 15b is a three-way joint similarly to the branch portion 15a, and two of the three inlets and outlets are coolant inflow ports, and the remaining one is coolant outflow port.

Furthermore, an outlet side of the bypass passage 18 is connected to the refrigerant inflow port of the joint portion 15b of the present embodiment. An open-close valve 18a for opening and closing the bypass passage 18 is disposed in the bypass passage 18. The opening-closing operation of the open-close valve 18a is controlled by a control voltage from the air-conditioning controller 40. The open-close valve 18a functions as a refrigerant circuit switching device together with the cooling expansion valve 16.

The suction side of the compressor 11 is connected to a refrigerant outlet of the accumulator 19. Therefore, the accumulator 19 limits liquid-phase refrigerant from being drawn into the compressor 11 to avoid liquid compression of the compressor 11.

Next, the heat medium circulation circuit 20 will be described. As described above, the heat medium circulation circuit 20 is a heat medium circuit in which cooling water for cooling the engine 60 circulates. Therefore, the heat medium circulation circuit 20 is connected to a cooling water passage formed in the engine 60. Further, a water pump 21 for circulating the cooling water is disposed in the heat medium circulation circuit 20.

The water pump 21 is a pumping device that pumps the cooling water flowing out of the heater core 22 toward the inlet side of the cooling water passage of the engine 60. A rotation speed (a water pumping capacity) of the water pump 21 is controlled by a control voltage output from the air-conditioning controller 40.

An outlet side of the cooling water passage of the engine 60 is connected to an inlet side of the water-refrigerant heat exchanger 12. Further, the outlet side of the water-refrigerant heat exchanger 12 is connected to a heat medium inflow port of a heater core 22. The heater core 22 is a second heat exchanger that is disposed in the casing 31 of the inside air-conditioning unit 30 and exchanges heat between the cooling water heated by the water-refrigerant heat exchanger 12 and the blown air having passed through the inside evaporator 17, and heats the blown air.

Accordingly, when the air-conditioning controller 40 actuates the water pump 21, the cooling water circulates in the heat medium circulation circuit 20, in order, the water pump 21, the engine 60, the water passage of the water-refrigerant heat exchanger 12, the heater core 22, and the water pump 21, as shown in FIG. 1. Thus, in the heat pump system 1 of the present embodiment, the cooling water heated by the water-refrigerant heat exchanger 12 flows into the heater core 22 to heat the blown air in the heating operation, for example.

In addition, a heat dissipation circulation circuit 25 is connected to the engine 60. The heat dissipation circulation circuit 25 is a water circulation circuit for dissipating heat of the cooling water heated by absorbing the waste heat of the engine 60. The heat dissipation circulation circuit 25 is connected in parallel to the heat medium circulation circuit 20. Furthermore, a radiator 26 is disposed in the heat dissipation circulation circuit 25.

The radiator 26 is a heat-dissipation heat exchanger that exchanges heat between the cooling water and the outside air to dissipate heat of the cooling water. Further, a mechanical water pump (not shown) working in conjunction with the engine 60 is disposed in the heat dissipation circulation circuit 25. Therefore, when the engine 60 is actuated, the cooling water circulates between the engine 60 and the radiator 26 as indicated by dashed arrows in FIG. 1.

When the engine 60 is in operation, the cooling water absorbs the waste heat of the engine 60 and increases in temperature. Therefore, the engine 60 also functions as a heating unit heating the cooling water.

Next, the inside air-conditioning unit 30 will be described. The inside air-conditioning unit 30 is disposed inside an instrument panel at the foremost part of the inside of the vehicle compartment. The inside air-conditioning unit 30 houses the blower 32, the inside evaporator 17, and the heater core 22, for example, in the casing 31 forming the outer shell of the inside air-conditioning unit 30 to blow the blown air adjusted in temperature by the heat pump system 1 into the vehicle compartment.

The casing 31 is formed of a resin having a certain degree of elasticity and an excellent strength (e.g., polypropylene). The casing 31 defines an air passage of the blown air sent to the vehicle compartment. At the most upstream side of the casing 31 with respect to the flow of the blown air, an inside-outside air switching device 33 for selectively introducing inside air (air in the vehicle compartment) and outside air (air outside the vehicle compartment) into the casing 31 is disposed.

The inside-outside air switching device 33 continuously adjusts the opening area of the inside air introduction port for introducing the inside air into the casing 31 and the outside air introduction port for introducing the outside air by an inside-outside air switching door to adjust introduction rate of introduced airflow. The inside-outside air switching door is actuated by an electric actuator for the inside-outside air switching door. The electric actuator is controlled by a control signal output from the air-conditioning controller 40.

A blower 32 that blows air drawn through the inside-outside air switching device 33 toward the vehicle compartment is located downstream of the inside-outside air switching device 33 with respect to the flow of the blown air. The blower 32 is an electric blower in which a multi-blade centrifugal fan (sirocco fan) is actuated by an electric motor. A rotational speed (amount of blown air) of the blower 32 is controlled by the control voltage output from the air-conditioning controller 40.

The inside evaporator 17 and the heater core 23 are located downstream of the blower 32 in this order with respect to the flow of the blown air. That is, the inside evaporator 17 is located upstream of the heater core 23 with respect to the flow of the blown air. In the casing 31, a cold air bypass passage 35 through which the blown air having passed through the inside evaporator 17 bypasses the heater core 23 and flows to the downstream side is defined.

The inside evaporator 17 and the heater core 22 are located downstream of the blower 32 in this order with respect to the flow of the blown air. That is, the inside evaporator 17 is located upstream of the heater core 22 with respect to the flow of the blown air. In the casing 31, a cold air bypass passage 35 through which the blown air having passed through the inside evaporator 17 bypasses the heater core 22 and flows to the downstream side is defined.

An air mix door 34 that adjusts the volume rate of the air flowing through the heater core 22 in the blown air having passed through the inside evaporator 17 is located downstream of the inside evaporator 17 and upstream of the heater core 22 with respect to the flow of the blown air.

An mixing space in which the blown air heated by the heater core 22 and the blown air that flows through the cold air bypass passage 35 and not heated by the heater core 22 are mixed is located downstream of the heater core 22. An open hole through which the blown air (conditioned air) mixed in the mixing space is blown into the vehicle compartment that is the air-conditioning target space is located in a most downstream part of the casing 31.

The open holes include a face open hole, a foot open hole, and a defogger open hole (all not shown). The face open hole is an open hole for blowing the conditioned air toward the upper body of an occupant in the vehicle compartment. The foot open hole is an open hole for blowing the conditioned air toward feet of an occupant in the vehicle compartment. The defogger open hole is an open hole for blowing the conditioned air toward the inside of a windshield.

The face open hole, the foot open hole, and the defogger open hole are respectively connected to a face blowing port, a foot blowing port, and a defogger blowing port (all not shown) in the vehicle compartment through ducts defining air passages.

The air-mix door 34 adjusts the proportion of the air passing through the heater core 22 and the air flowing through the cold air bypass passage 35, and accordingly the temperature of the conditioned air mixed in the mixing space is adjusted. According to this, the temperature of the blown air (conditioned air) blown into the vehicle compartment through the blowing ports is adjusted.

That is, the air-mix door 34 works as a temperature adjusting portion that adjusts the temperature of the conditioned air blown into the vehicle compartment. The air-mix door 34 is actuated by an electric actuator for the air-mix door. The electric actuator is controlled by a control signal output from the air-conditioning controller 40.

A face door (not shown) that adjusts an opening area of the face open hole is located upstream of the face open hole with respect to the flow of the blown air. A foot door (not shown) that adjusts an opening area of the foot open hole is located upstream of the foot open hole with respect to the flow of the blown air. A defogger door (not shown) that adjusts an opening area of the defogger open hole is located upstream of the defogger open hole with respect to the flow of the blown air.

The face door, the foot door, and the defogger door constitute an open hole mode switching device that switches an open hole mode and are joined to an electric actuator for actuating the blowing port mode door through a link mechanism. The face door, the foot door, and the defogger door are operated to rotate together with the electric actuator. The operation of the electric actuator is controlled by a control signal output from the air-conditioning controller 40.

The blowing port mode switched by the blowing port mode switching device includes a face mode, a bi-level mode, and a foot mode, for example.

In the face mode, the face blowing port is fully open so that the air is blown toward the upper body of an occupant through the face blowing port. In the bi-level mode, the face blowing port and the foot blowing port are fully open so that the air is blown toward the upper body and feet of an occupant. In the foot mode, the foot blowing port is fully open and the defroster blowing port is open by a small opening degree so that the air is blown mainly through the foot blowing port.

An occupant can set a defogger mode, in which the defogger blowing port is fully open so that the air is blown toward the inside of the windshield, by manually operating a blowing mode switching switch provided on an operation panel 50.

Next, an outline of an electric control unit of the present embodiment will be described. The air-conditioning controller 40 includes a known microcomputer including CPU, ROM, RAM and the like, and peripheral circuits. The air-conditioning controller 40 performs various calculations and processes based on air-conditioning control programs stored in the ROM, and controls actuations of the various control target devices 11, 13, 14a, 16, 18a, 21, 32, etc. connected to the output side.

Figure 2:
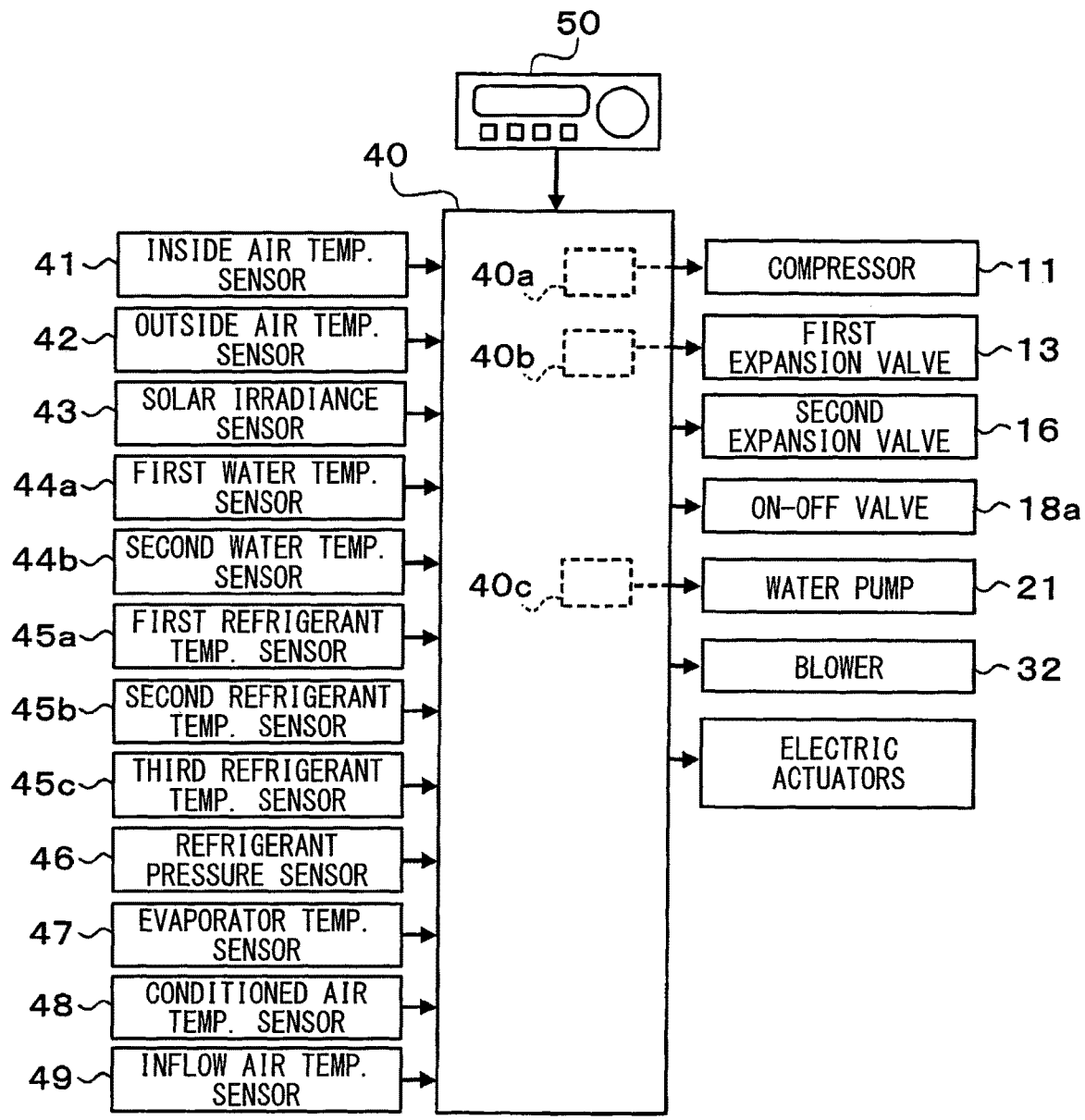
FIG. 2 is a block diagram illustrating an electric controller of the heat pump system of the first embodiment.

To the input side of the air-conditioning controller 40, an inside air temperature sensor 41, an outside air temperature sensor 42, a solar irradiance sensor 43, a first, second water temperature sensor 44a, 44b, first to third refrigerant temperature sensor 45a-45c, a refrigerant pressure sensor 46, an evaporator temperature sensor 47, a conditioned air temperature sensor 48, and an inflow air temperature sensor 49, for example, are connected as shown in block diagram in FIG. 2. Detection signals of this sensor group are input to the air-conditioning controller 40.

The inside air temperature sensor 41 is an inside air temperature detection unit that detects a vehicle-compartment interior temperature (an inside air temperature) Tr. The outside air temperature sensor 42 is an outside air temperature detection unit that detects a vehicle-compartment exterior temperature (an outside air temperature) Tam. The solar irradiance sensor 43 is a solar irradiance detection unit that detects a solar irradiance As in the vehicle compartment.

The first water temperature sensor 44a is a first water temperature detection unit that detects an inlet side water temperature TW1 of the cooling water flowing into the water passage of the water-refrigerant heat exchanger 12. The second water temperature sensor 44b is a second water temperature detection unit that detects an outlet side water temperature TW2 of the cooling water flowing out of the water passage of the water-refrigerant heat exchanger 12.

The first refrigerant temperature sensor 45a is a first refrigerant temperature detection unit that detects an inlet side refrigerant temperature TD1 of the refrigerant discharged by the compressor 11 and flowing into a refrigerant passage of the water-refrigerant heat exchanger 12. The second refrigerant temperature sensor 45b is a second refrigerant temperature detection unit that detects an outlet side refrigerant temperature TD2 of the refrigerant discharged from the refrigerant passage of the water-refrigerant heat exchanger 12. Specifically, the second refrigerant temperature sensor 45b is provided to detect the temperature of the refrigerant on the outlet side of the heating expansion valve 13 and on the inlet side of the outside heat exchanger 14. The third refrigerant temperature sensor 45c is a third refrigerant temperature detection unit that detects a temperature (outside heat exchanger temperature) TD3 of the refrigerant flowing out of the outside heat exchanger.

The refrigerant pressure sensor 46 is a refrigerant pressure detection unit that detects a high-pressure side refrigerant pressure PD in the refrigerant passage between the discharge port side of the compressor 11 and the inlet side of the heating expansion valve 13. The evaporator temperature sensor 47 is an evaporator temperature detection unit that detects a refrigerant evaporation temperature (evaporator temperature) Tefin in the inside evaporator 17. The conditioned air temperature sensor 48 is a conditioned-air temperature detection unit that detects a blown air temperature TAV blown from the mixing space toward the vehicle compartment. The inflow air temperature sensor 49 is an inflow air temperature detection unit that detects an inflow air temperature TA1 flowing into the heater core 22.

The third refrigerant temperature sensor 45c of the present embodiment detects the temperature of the duct connected to the refrigerant outlet port of the outside heat exchanger 14, but the third refrigerant temperature sensor is not limited to this. A temperature detection unit that detects a temperature of the outside heat exchanger 14 may be adopted as the third temperature detector, and a temperature detection unit that detects the temperature of the refrigerant flowing through the outside heat exchanger 14 or the refrigerant right after flowing out of the outside heat exchanger 14 may be adopted as the third temperature detector.

The evaporator temperature sensor 47 detects the temperature of heat exchanging fins of the inside evaporator 17, but the evaporator temperature detection unit is not limited to this. A temperature detection unit that detects the temperature of another part of the inside evaporator 17 or a temperature detection unit that detects the temperature of the refrigerant flowing through the inside evaporator 17 may be employed as the evaporator temperature detection unit.

In the present embodiment, the blown air temperature sensor that detects the blown air temperature TAV is provided. However, a value calculated from the evaporator temperature Tefin, the discharged refrigerant temperature Td and the like may be used as the blown air temperature TAV.

The operation panel 50 provided in a vicinity of the instrument panel in a front part of the vehicle compartment is connected to the input side of the air-conditioning control device 40 as shown in FIG. 2, and operation signals from various switches provided on the operation panel 50 are input to the air-conditioning control device 40.

Specific examples of the various operation switches on the operation panel 50 are shown below: an auto switch for setting or stopping an automatic operation of the vehicle air-conditioner; a cooling switch for requesting a cooling of the vehicle compartment; an air volume setting switch for manually setting a volume blown by the blower 32; a temperature setting switch for setting a target temperature Tset of the vehicle compartment; and a blowing mode switching switch for manually setting the blowing mode.

Although the air-conditioning controller 40 of the present embodiment integrally includes control units for controlling various control target devices connected to the output side, a configuration (Hardware and software) for controlling the operation of each control target device constitutes a control unit for controlling the operation of each control target device.

For example, the configuration (hardware and software) for controlling the refrigerant discharge capacity of the compressor 11 (rotational speed of the compressor 11) in the air-conditioning control device 40 constitutes a discharge capacity control unit 40a. The configuration for controlling the throttle opening degree of the heating expansion valve 13 constitutes a throttle opening degree control unit 40b. In addition, the configuration for controlling the pumping capacity of the water pump 21 constitutes a pumping capacity control unit 40c.

Of course, the discharge capacity control unit 40a, the throttle opening degree control unit 40b, the pumping capacity control unit 40c, and the like may be configured as control devices separated from the air-conditioning control device 40. In FIG. 1, for example, signal lines and power lines connecting the air-conditioning controller 40 and various control target devices are shown, but the sensor group and signal lines connecting the sensor group and the air-conditioning controller 40 are omitted for the sake of clarity of illustration.

Next, the operation of the present embodiment in the above configuration will be described. The heat pump system 1 of the present embodiment is configured to switch between the cooling operation, the dehumidifying heating operation, and the heating operation. Switching between these operations is performed by executing the air-conditioning control program. The air-conditioning control program is executed when the auto switch of the operation panel 50 is turned on.

More specifically, in the main routine of the air-conditioning control program, the detection signal of the sensor group for air-conditioning control and the operation signal from various air-conditioning operation switches are read. Then, based on the value of the detection signal and the value of the operation signal, a target blown air temperature TAO which is a target temperature of the air blown into the vehicle compartment is calculated based on the following formula F1.

$$TAO = Kset \times Tset - Kr \times Tr - Kam \times Tam - Ks \times As + C \quad \text{(F1)}$$

Tset is the target temperature in the vehicle compartment set with the temperature setting switch, Tr is the inside air temperature detected by the inside air temperature sensor 41, Tam is the outside air temperature detected by the outside air temperature sensor 42, and As is the amount of solar irradiance detected by the solar radiation sensor 43. Kset, Kr, Kam, and Ks are control gains, and C is a constant for correction.

When the cooling switch of the operation panel 50 is turned on and the target blowing temperature TAO is lower than a predetermined cooling reference temperature KT, the cooling operation is performed. When the target blowing temperature TAO is equal to or higher than the cooling reference temperature KT in a state where the cooling switch is turned on, the dehumidifying-heating operation is performed. When the cooling switch is not turned on, the heating operation is performed.

Thus, the heat pump system 1 of the present embodiment performs: the cooling operation when the outside air temperature is relatively high, such as in the summer season; the dehumidifying-heating operation in early spring season or early winter season; and the heating operation when the outside air temperature is relatively low, such as the winter season. The heat pump system of the present embodiment performs the defrosting operation to remove frost when frost is formed on the outside heat exchanger 14. The operation in each operation mode will be described below.

(a) Cooling Operation

In the cooling operation, the pumping capacity control unit 40c of the air-conditioning controller 40 causes the water pump 21 to exert a predetermined pumping capacity. Further, the throttle opening degree control unit 40b of the air-conditioning control device 40 fully opens the heating expansion valve 13. Further, the air-conditioning control device 40 closes the open-close valve 18a and sets the cooling expansion valve 16 in a throttled state in which the cooling expansion valve 16 exhibits a pressure reducing action.

As a result, in the heat pump cycle 10 during the cooling operation, as shown by hollow arrows in FIG. 1, the vapor compression type refrigeration cycle is formed, in which the refrigerant circulates, in order, the compressor 11, the water-refrigerant heat exchanger 12, (the heating expansion valve 13), the outside heat exchanger 14, the cooling expansion valve 16, the inside evaporator 17, the accumulator 19, and the compressor 11.

Furthermore, in the configuration of this refrigerant circuit, the air-conditioning control device 40 controls the operation state of the various control target devices (control signals to be output to the various control target devices) on the basis of the target outlet temperature TAO and the detection signals of the sensors group.

For example, the refrigerant discharge capacity of the compressor 11, i.e. the control signal output to the electric motor of the compressor 11, is determined as follows. First, a target evaporator temperature TEO of the inside evaporator 17 is determined on the basis of the target blowing temperature TAO with reference to a control map which is previously stored in the air-conditioning controller 40.

Specifically, in this control map, the target evaporator temperature TEO is determined to decrease with decrease of the target blowing temperature TAO. Further, the target evaporator temperature TEO is determined so as to be equal to or higher than a reference frost-preventing temperature (for example, 1 degree Celsius) at which frost formation on the inside evaporator 17 can be prevented.

Based on the difference between the target evaporator temperature TEO and the evaporator temperature Tefin detected by the evaporator temperature sensor 47, the control signal to be output to the electric motor of the compressor 11 is determined by using feedback control method such that the evaporator temperature Tefin approaches the target evaporator temperature TEO.

The control signal output to the blower 32 is determined on the basis of the target blowing temperature TAO with reference to a control map which is previously stored in the air-conditioning controller 40. Specifically, in the control map, the blown air volume by the blower 32 is the maximum when the target blowing temperature TAO is in an extremely low temperature range (maximum cooling range) and an extremely high temperature range (maximum heating range).

The blown air volume is decreased with increase of the target blowing temperature TAO from the extremely low temperature range toward a medium temperature range, and is decreased with decrease of the target blowing temperature TAO from the extremely high temperature range toward the medium temperature range. When the target blowing temperature TAO is in the medium temperature range, the blown air volume is set to be a minimum volume.

The control signal to be output to the electric actuator driving the air-mix door 34 is determined such that the air-mix door 34 closes the air passage extending toward the heater core 22, and accordingly all of the blown air having passed through the inside evaporator 17 bypasses the heater core 22.

The control signal to be output to the cooling expansion valve 16 is determined with reference to a control map previously stored in the air-conditioning controller 40 such that a degree of subcooling of the refrigerant flowing into the cooling expansion valve 16 approaches a target subcooling degree in cooling. The target subcooling degree in cooling is a target value determined such that a coefficient of performance (COP) of the heat pump cycle is approximately maximum during the cooling operation.

The control voltage to be output to the blower fan 14a is determined so that the blower fan 14a exerts a predetermined blowing capacity according to the operation mode.

Then, the control signals and the like decided as described above are output to the various control target devices. A control routine is repeated at a predetermined control cycle until a stop of the operation of the vehicle air-conditioner is required. The control routine includes, in order, reading the above-described detection signals and the operation signals, calculation of the target blowing temperature TAO, determining the operation state of the various control target devices, and outputting the control voltage and the control signals. It is noted that the repetition of the control routine is similarly performed in other operation modes.

Therefore, in the heat pump cycle 10 during the cooling operation, the high-pressure refrigerant discharged from the compressor 11 flows into the refrigerant passage of the water-refrigerant heat exchanger 12. When the temperature of the cooling water flowing into the water passage of the water-refrigerant heat exchanger 12 is lower than the temperature of the high pressure refrigerant flowing into the water-refrigerant heat exchanger 12, the heat of the high pressure refrigerant is dissipated to the cooling water and the cooling water circulating in the heat medium circulation circuit 20 is heated.

In the cooling operation, since the air-mix door 34 closes the air passage in which the heater core 22 is provided, almost all of the cooling water circulating in the heat medium circulation circuit 20 flows out of the heater core 22 without exchanging heat with the blown air even if the cooling water flows into the heater core 22.

Therefore, the temperature of the cooling water circulating in the heat medium circulation circuit 20 increases until the temperature becomes equal to the temperature of the high pressure refrigerant after the start of the cooling operation. Then, when the temperature of the cooling water circulating in the heat medium circulation circuit 20 increases to be equal to the temperature of the high pressure refrigerant, almost all of the cooling water flows out of the water-refrigerant heat exchanger 12 even if the high-pressure refrigerant flows into the water-refrigerant heat exchanger 12.

The refrigerant flowing out of the refrigerant passage of the water-refrigerant heat exchanger 12 flows into the outside heat exchanger 14 via the fully-opened heating expansion valve 13. The refrigerant flowing into the outside heat exchanger 14 dissipates heat by exchanging heat with the outside air blown by the blower fan 14a in the outside heat exchanger 14.

Since the open-close valve 18a is closed, the refrigerant flowing out of the outside heat exchanger 14 flows into the cooling expansion valve 16 via the branch portion 15a. The refrigerant flowing into the cooling expansion valve 16 is decompressed until it becomes low-pressure refrigerant. The refrigerant decompressed by the cooling expansion valve 16 flows into the inside evaporator 17, absorbs heat from the blown air sent from the blower 32, and evaporates. As a result, the blown air is cooled.

The refrigerant flowing out of the inside evaporator 17 flows into the accumulator 19 via the joint portion 15b. The gas-phase refrigerant separated by the accumulator 19 is sucked into the compressor 11 and compressed again.

As described above, the heat pump system 1 in the cooling operation is capable of cooling the vehicle compartment by blowing the air cooled by the inside evaporator 17.

During the cooling operation, if the temperature of the cooling water circulating in the heat medium circulation circuit 20 is increased until it becomes equal to the temperature of the high pressure refrigerant, the heat of the refrigerant and the cooling water in the water-refrigerant heat exchanger 12 is not exchanged. Therefore, during the cooling operation, the pumping capacity control unit 40c of the air-conditioning controller 40 may stop the water pump 21.

(b) Dehumidifying-Heating Operation

In the dehumidifying-heating operation, the pumping capacity control unit 40c of the air-conditioning controller 40 causes the water pump 21 to exert a predetermined pumping capacity. Further, the throttle opening degree control unit 40b of the air-conditioning control device 40 controls the heating expansion valve 13 to be a throttled state. Further, the air-conditioning control device 40 closes the open-close valve 18a and sets the cooling expansion valve 16 in a throttled state in which the cooling expansion valve 16 exhibits a pressure reducing action.

As a result, in the heat pump cycle 10 during the dehumidifying-heating operation, as shown by arrows hatched with diagonal lines in FIG. 1, the vapor compression type refrigeration cycle is formed, in which the refrigerant circulates, in order, the compressor 11, the water-refrigerant heat exchanger 12, the heating expansion valve 13, the outside heat exchanger 14, the cooling expansion valve 16, the inside evaporator 17, the accumulator 19, and the compressor 11. That is, in the dehumidifying-heating operation, a refrigeration cycle in which the refrigerant circulates in substantially the same order as the cooling operation is configured.

Furthermore, in the configurations of the heat medium circuit and the refrigerant circuit, the air-conditioning control device 40 controls the operation state of the various control target devices (control signals to be output to the various control target devices) on the basis of the target blowing temperature TAO and the detection signals of the sensor group.

For example, the control signal output to the electric motor of the compressor 11, the control voltage output to the blower 32, and the control voltage output to the blower fan 14a are determined in the same manner as in the cooling operation.

The control signal to be output to the heating expansion valve 13 is determined with reference to a control map previously stored in the air-conditioning controller 40 such that a degree of subcooling of the refrigerant flowing into the heating expansion valve 13 approaches a target subcooling degree in heating. The target subcooling degree in heating is a target value determined such that a coefficient of performance (COP) of the heat pump cycle is approximately maximum during the dehumidifying-heating operation or the heating operation.

The control signal to be output to the electric actuator of the air-mix door 34 is determined so that the blown air temperature TAV detected by the conditioned air temperature sensor 48 approaches the target blowing temperature TAO.

Therefore, in the heat pump cycle 10 during the dehumidifying-heating operation, the high-pressure refrigerant discharged from the compressor 11 flows into the refrigerant passage of the water-refrigerant heat exchanger 12. The refrigerant flowing into the refrigerant passage of the water-refrigerant heat exchanger 12 exchanges heat with the cooling water flowing through the water passage of the water-refrigerant heat exchanger 12. As a result, the cooling water circulating in the heat medium circulation circuit 20 is heated.

The cooling water heated by the water-refrigerant heat exchanger 12 flows into the heater core 22. In the dehumidifying-heating operation, since the air-mix door 34 opens the air passage in which the heater core 22 is provided, the cooling water flowing into the heater core 22 exchanges heat with the air having passed through the inside evaporator 17. As a result, a part of the blown air having passed through the inside evaporator 17 is heated. Then, the temperature of the blown air sent from the mixing space of the inside air-conditioning unit 30 to the vehicle compartment approaches the target blowing temperature TAO.

The refrigerant flowing out of the water-refrigerant heat exchanger 12 flows into the heating expansion valve 13 and is decompressed until it becomes low-pressure refrigerant. The low-pressure refrigerant decompressed by the heating expansion valve 13 flows into the outside heat exchanger 14. The refrigerant flowing into the outside heat exchanger 14 absorbs heat from the outside air blown by the blower fan 14a to be evaporated.

Since the open-close valve 18a is closed, the refrigerant flowing out of the outside heat exchanger 14 flows into the inside evaporator 17 via the branch portion 15a and the fully-opened cooling expansion valve 16. The refrigerant flowing into the inside evaporator 17 absorbs heat from the blown air sent from the blower 32 and evaporates. As a result, the blown air is cooled and dehumidified. The subsequent operation is the same as the cooling operation.

As described above, the heat pump system 1 in the dehumidifying-heating operation is capable of dehumidifying and heating the vehicle compartment by blowing the air cooled and dehumidified by the inside evaporator 17 after reheating by the heater core 22. Further, during the dehumidifying-heating operation, since the cooling water can be heated by the heat pump cycle 10, dehumidification and heating in the vehicle compartment can be performed even when the engine 60 that is a heating portion is not operating.

(c) Heating Operation

In the heating operation, the pumping capacity control unit 40c of the air-conditioning controller 40 causes the water pump 21 to exert a predetermined pumping capacity. Further, the throttle opening degree control unit 40b of the air-conditioning control device 40 controls the heating expansion valve 13 to be a throttled state. Further, the air-conditioning control device 40 opens the open-close valve 18a and sets the cooling expansion valve 16 to be a fully-close state.

As a result, in the heat pump cycle 10 during the heating operation, as shown by black arrows in FIG. 1, the vapor compression type refrigeration cycle is formed, in which the refrigerant circulates, in order, the compressor 11, the water-refrigerant heat exchanger 12, the heating expansion valve 13, the outside heat exchanger 14, the bypass passage 18, the accumulator 19, and the compressor 11.

Furthermore, in the configurations of the heat medium circuit and the refrigerant circuit, the air-conditioning control device 40 controls the operation state of the various control target devices (control signals to be output to the various control target devices) on the basis of the target blowing temperature TAO and the detection signals of the sensor group.

For example, the refrigerant discharge capacity of the compressor 11, i.e. the control signal output to the electric motor of the compressor 11, is determined as follows. First, a target condensing temperature TCO in the water-refrigerant heat exchanger 12 is determined on the basis of the target blowing temperature TAO with reference to a control map which is previously stored in the air-conditioning controller 40. Specifically, in this control map, the target condensing temperature TCO is determined to increase with increase of the target blowing temperature TAO.

Based on the difference between the target condensing temperature TCO and the inlet side refrigerant temperature TD1 detected by the first refrigerant temperature sensor 45a, the control signal to be output to the electric motor of the compressor 11 is determined by using feedback control method such that the inlet side refrigerant temperature sensor TD1 approaches the target condensing temperature TCO.

The control voltage output to the blower 32 and the control voltage output to the blower fan 14a are determined in the same manner as in the cooling operation. The control signal output to the heating expansion valve 13 is determined in the same manner as the dehumidifying-heating operation.

The control signal to be output to the electric actuator of the air-mix door 34 is determined such that the air-mix door 34 closes the cold air bypass passage 35, and accordingly all of the blown air having passed through the air passage in which the heater core 22 is provided.

Therefore, in the heat pump cycle 10 during the heating operation, the high-pressure refrigerant discharged from the compressor 11 flows into the refrigerant passage of the water-refrigerant heat exchanger 12 as in the dehumidifying-heating operation. The refrigerant flowing into the refrigerant passage of the water-refrigerant heat exchanger 12 exchanges heat with the cooling water flowing through the water passage of the water-refrigerant heat exchanger 12. As a result, the cooling water circulating in the heat medium circulation circuit 20 is heated.

The cooling water heated by the water-refrigerant heat exchanger 12 flows into the heater core 22. In the heating operation, since the air-mix door 34 fully opens the air passage in which the heater core 22 is provided, the cooling water flowing into the heater core 22 exchanges heat with the air having passed through the inside evaporator 17. As a result, the blown air having passed through the inside evaporator 17 is heated.

The refrigerant flowing out of the water-refrigerant heat exchanger 12 flows into the heating expansion valve 13 and is decompressed until it becomes low-pressure refrigerant. The low-pressure refrigerant decompressed by the heating expansion valve 13 flows into the outside heat exchanger 14. The refrigerant flowing into the outside heat exchanger 14 absorbs heat from the outside air blown by the blower fan 14a and passed through the radiator 26 to be evaporated, as in the dehumidifying-heating operation.

Since the open-close valve 18a is open and the cooling expansion valve 16 is fully closed, the refrigerant flowing out of the outside heat exchanger 14 flows into the accumulator 19 via the branch portion 15a and the bypass passage 18, and accordingly the refrigerant is separated into a gas-phase refrigerant and a liquid-phase refrigerant. The gas-phase refrigerant separated by the accumulator 19 is sucked into the compressor 11 and compressed again as in the cooling operation and the dehumidifying-heating operation.

As described above, the heat pump system 1 in the heating operation is capable of heating the vehicle compartment by blowing the air heated by the heater core 22. Further, during the heating operation, as in the dehumidifying-heating operation, the cooling water can be heated by the heat pump cycle 10, and accordingly dehumidification and heating in the vehicle compartment can be performed even when the engine 60 is not operating.

Here, in the configuration in which the outside heat exchanger 14 of the heat pump cycle 10 functions as an evaporator, such as the dehumidifying-heating operation and the heating operation of the heat pump system 1, when the refrigerant evaporation temperature of the outside heat exchanger 14 is below zero degrees Celsius, frost may be formed on the outside heat exchanger 14.

When frost is formed, the outside air passage of the outside heat exchanger 14 is blocked by the frost, and accordingly the heat exchange performance of the outside heat exchanger 14 may be deteriorated. Therefore, the amount of heat absorbed by the refrigerant in the outside heat exchanger 14 from the outside air is considerably lowered, and the heat pump cycle 10 may not sufficiently heat the cooling water. As a result, the passenger's warming feeling may deteriorate.

In contrast, the heat pump system 1 of the present embodiment performs the defrosting operation to remove frost when frost is formed on the outside heat exchanger 14. The defrosting operation will be described below.

(d) Defrosting Operation

Figure 3:
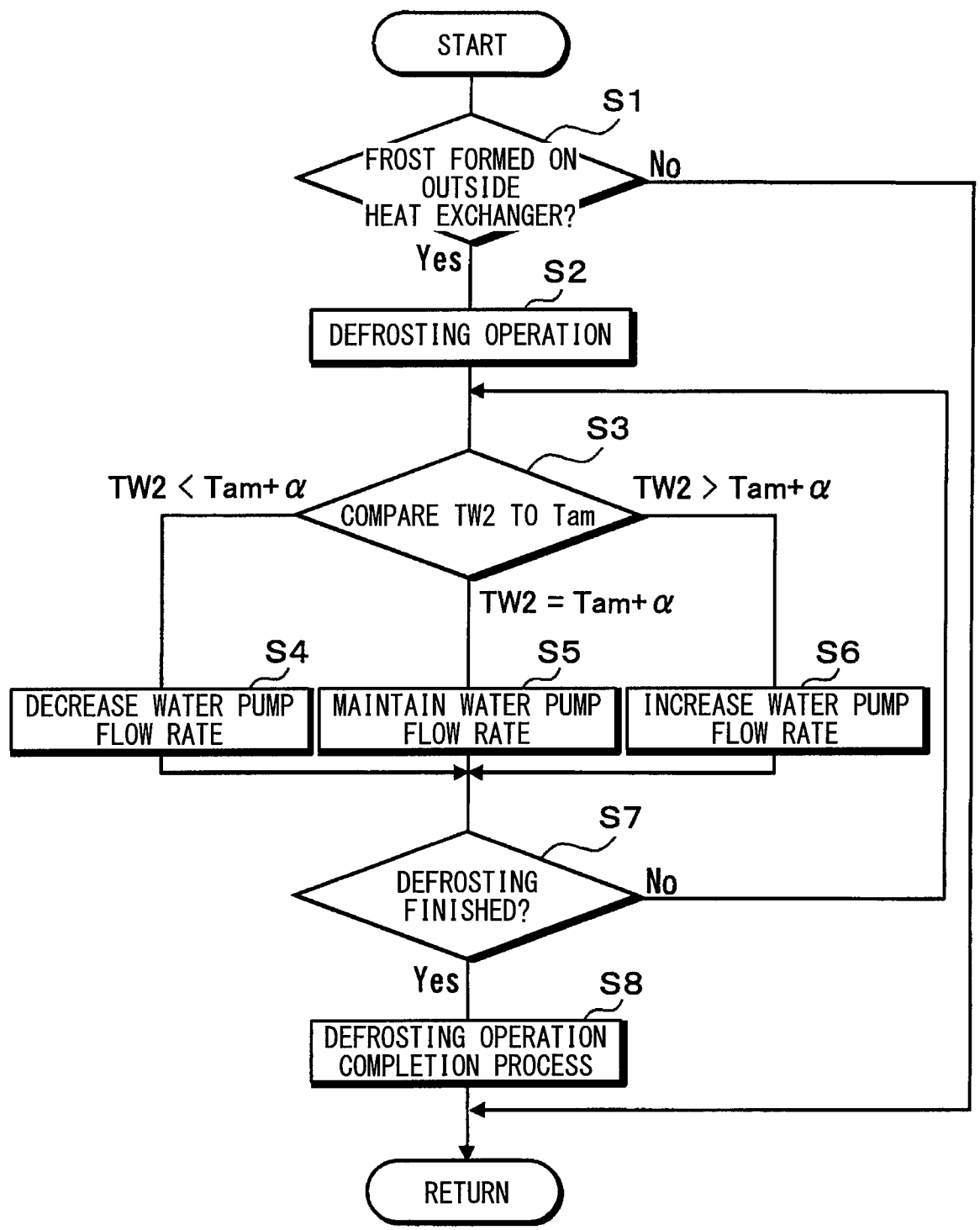
FIG. 3 is a flowchart illustrating a control process of the heat pump system of the first embodiment.

The defrosting operation will be described with reference to the flowchart of FIG. 3. The flowchart shown in FIG. 3 is a control process executed at predetermined intervals as a subroutine for the main routine of the air-conditioning control program. Control steps in flowcharts of FIG. 3 constitute function implementation devices (function implementation sections) included in the air-conditioning controller 40.

First, in step S1, it is determined whether frost is formed on the outside heat exchanger 14. Specifically, step S1 of the present embodiment determines that the frost is formed on the outside heat exchanger 14 when the difference between the outside air temperature Tam and the outside heat exchanger temperature TD3 detected by the third refrigerant temperature sensor 45*c* (Tam−TD3) is at or above a predetermined temperature difference. Therefore, the control step S1 constitutes a frost formation determination section.

Furthermore, step S1 of the present embodiment determines whether the operation condition is in a condition where frost formation may occur on the outside heat exchanger (air heat exchanger) 14 in order to determine whether frost is actually formed on the outside heat exchanger 14. That is, in step S1, it is determined whether frost may be formed on the outside heat exchanger 14.

Then, when it is determined that frost is formed on the outside heat exchanger 14 in step S1, the process proceeds to step S2. In contrast, when it is not determined that frost is formed on the outside heat exchanger 14, the process returns to the main routine.

In step S2, the operation state (control signal to be output to various control target devices) of various control target devices at the time of executing the defrosting operation is determined, and the process proceeds to step S3.

Specifically, in the defrosting operation, the throttle opening degree control unit 40*b* of the air-conditioning controller 40 controls the heating expansion valve 13 to be a throttled state. At this time, the throttle opening degree control unit 40*b* increases the opening degree of the heating expansion valve 13 compared to the heating operation so that the outlet side refrigerant temperature TD2 detected by the second refrigerant temperature sensor 45*b* approaches the outlet side water temperature TW2 detected by the second water temperature sensor 44*b*.

Further, the air-conditioning controller 40 opens the on-off valve 18*a*, fully closes the cooling expansion valve 16, and stops the operation of the blower fan 14*a* sending the outside air toward the outside heat exchanger 14.

In step S3, the outside air temperature Tam and the outlet side water temperature TW2 are compared to each other.

Specifically, when it is determined in step S3 that the outlet side water temperature TW2 is lower than a value (Tam+α) obtained by adding the first reference temperature α (in this embodiment, 40 degrees Celsius) to the outside air temperature Tam, the process proceeds to step S4. In step S4, the pumping capacity control unit 40*c* of the air-conditioning controller 40 decreases the flow rate (that is, the pumping capacity) of the water pump 21 by a predetermined amount, and the process proceeds to step S7.

When it is determined in step S3 that the outlet side water temperature TW2 is equal to the value (Tam+α) obtained by adding the first reference temperature α to the outside air temperature Tam, the process proceeds to step S5. In step S5, the pumping capacity control unit 40*c* maintains the flow rate of the water pump 21, and the process proceeds to step S7.

When it is determined in step S3 that the outlet side water temperature TW2 is higher than the value (Tam+α) obtained by adding the first reference temperature α to the outside air temperature Tam, the process proceeds to step S6. In step S6, the pumping capacity control unit 40*c* increases the flow rate of the water pump 21 by a predetermined amount, and the process proceeds to step S7.

In step S3, it is determined that TW2 is equal to Tam+α when the value (Tam+α) obtained by adding the first reference temperature a to the actual outside air temperature Tam is completely equal to the actual outlet side water temperature TW2. Since there are detection errors and the like in each temperature detecting unit, one which determines that TW2 is equal to Tam+α when the difference (absolute value) between TW2 and Tam+α is equal to or smaller than a predetermined minute value may be adopted.

Here, in steps S3 to S6, the pumping capacity of the water pump 21 is increased with increase of the temperature difference between TW2 and Tam (TW2−Tam) in step by step manner. Furthermore, in a general vehicle, the cooling water temperature is prevented from fluctuating greatly by adjusting the amount of cooling water flowing through the radiator 26.

Therefore, in steps S3 to S7 of the present embodiment, the pumping capacity of the water pump 21 is increased mainly with decrease of the outside air temperature Tam. Further, the required heating capacity required for the heat pump system 1 (that is, the required heating capacity required for heating the blown air) to heat the vehicle compartment increases with decrease of the outside temperature Tam.

Therefore, during the defrosting operation, the pumping capacity control unit 40*c* of the present embodiment increases the pumping capacity of the water pump 21 with increase of the required heating capacity. More specifically, in the defrosting operation, the pumping capacity control unit 40*c* determines that the required heating capacity increases with increase of the difference between the outlet side water temperature TW2 and the outside air temperature Tam (TW2−Tam), and the pumping capacity control unit 40*c* increases the pumping capacity of the water pump 21.

Furthermore, the pumping capacity control unit 40*c* changes the pumping capacity within a range where the outlet-side refrigerant temperature TD2 is equal to or higher than a predetermined reference refrigerant temperature KTH. The reference refrigerant temperature KTH is a value determined experimentally as a temperature at which defrosting of the outside heat exchanger 14 can be reliably performed.

In step S7, it is determined whether the defrosting of the outside heat exchanger 14 has been completed. When it is determined that the defrosting of the outside heat exchanger 14 is completed in step S7, the process proceeds to step S8. In contrast, when it is determined that the defrosting of the outside heat exchanger 14 is not completed, the process returns to step S3.

In step S8, a defrosting operation completion process is performed. The defrosting operation completion process is a control for avoiding a sudden change in the outlet side water temperature TW2 due to a sudden change in the pumping capacity of the water pump 21 when the defrosting operation is changed to the dehumidifying-heating operation or the heating operation.

Specifically, in this step S8, the amount of change of the pumping capacity of the water pump 21 is limited until a predetermined standby time has elapsed so that the pumping capacity is not changed suddenly. After the defrosting operation completion process, the process returns to the main routine.

Therefore, according to the heat pump system 1 of the present embodiment, when it is determined that frost is formed on the outside heat exchanger 14, the refrigerant circuit is switched to the same refrigerant circuit as in the heating operation, and the throttle opening degree control unit 40b of the air-conditioning controller 40 increases the opening degree of the heating expansion valve 13. As a result, it is possible to execute so-called hot gas defrosting, in which the temperature of the refrigerant flowing into the outside heat exchanger 14 is increased to defrost the outside heat exchanger 14.

At this time, the pumping capacity control unit 40c of the air-conditioning controller 40 increases the pumping capacity of the water pump 21 with increase of the temperature difference (TW2−Tam). Therefore, it is possible to prevent the refrigerant from losing heat required for defrosting in the water-refrigerant heat exchanger 12 through heat dissipation. Further, it is possible to suppress the temperature decrease of the cooling water flowing out of the water-refrigerant heat exchanger 12 and to supply the cooling water of a relatively high temperature to the heater core 22.

Figure 4:
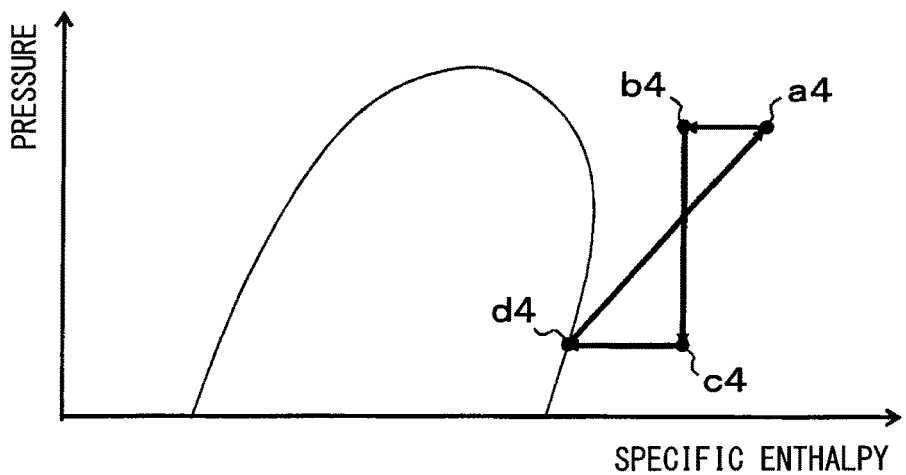
FIG. 4 is a Mollier diagram illustrating a change in state of refrigerant in the heat pump cycle during the defrosting operation.
Figure 5:
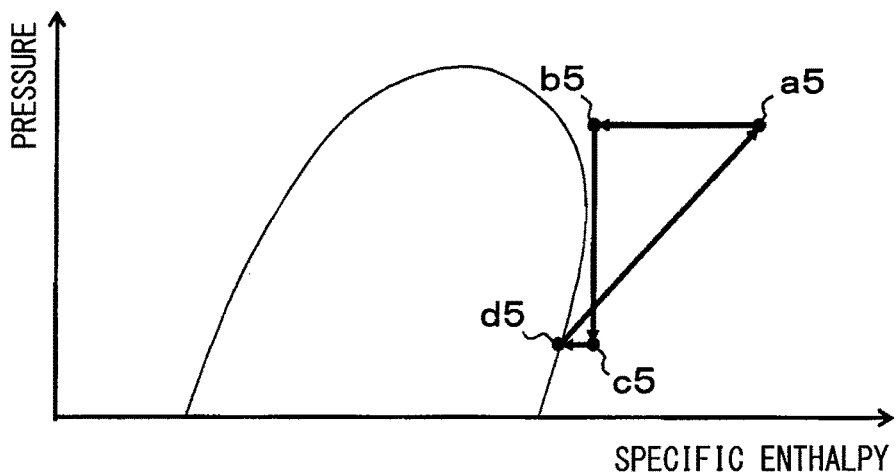
FIG. 5 is a Mollier diagram illustrating a change in state of refrigerant in a heat pump cycle of a comparative example when a pumping capacity of a water pump is increased during a defrosting operation.
Figure 6:
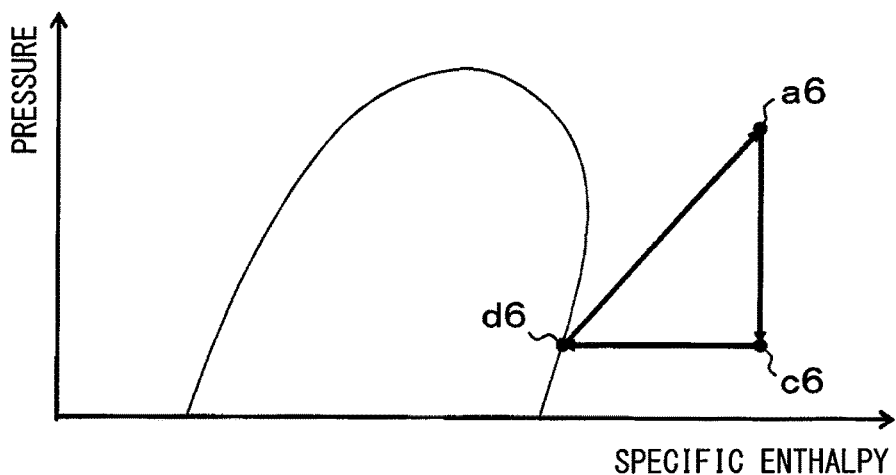
FIG. 6 is a Mollier diagram illustrating a change in state of refrigerant in the heat pump cycle of the comparative example when the water pump is stopped during a defrosting operation.

This will be described in detail with reference to FIGS. 4 to 6. FIG. 4 is a Mollier diagram showing a change in the state of the refrigerant in the heat pump cycle 10 during the defrosting operation. FIG. 5 is a Mollier diagram of a comparative example where the pumping capacity of the water pump 21 is made relatively large during the defrosting operation in a cycle equivalent to that of the heat pump cycle 10 of the present embodiment. FIG. 6 is a Mollier diagram of a comparative example where the pumping capacity of the water pump 21 is stopped during the defrosting operation in a cycle equivalent to that of the heat pump cycle 10 of the present embodiment.

In FIGS. 5 and 6, the same alphabet as the Mollier diagram of FIG. 4 is used for those showing the state of the refrigerant equivalent or corresponding to the cycle configuration, and the subscripts (numbers) are changed.

First, if the pumping capacity of the water pump 21 is not changed from the heating operation and the pumping capacity is relatively large as in the comparative example of the present disclosure, most of the heat of the refrigerant discharged from the compressor 11 (point a5 in FIG. 5) may be dissipated to the cooling water (from point a5 to point b5 in FIG. 5) as shown in the Mollier diagram of FIG. 5. Therefore, it is possible to dissipate only very limited heat of the refrigerant (point c5 in FIG. 5) flowing into the outside heat exchanger 14 (from point c5 to point d5 in FIG. 5) by the outside heat exchanger 14, and it may not possible to achieve defrosting of the outside heat exchanger 14.

On the other hand, if the water pump 21 is stopped during the defrosting operation, the refrigerant (point a6 in FIG. 6) discharged from the compressor 11 may be decompressed by the heating expansion valve 13 without releasing its heat to the cooling water (from point a6 to point c6 in FIG. 6), as shown in the Mollier diagram of FIG. 6. Further, since the cooling water is not supplied to the heater core 22, there is a possibility that the blown air cannot be heated.

In contrast, in the defrosting operation of the heat pump system 1 of the present embodiment, since the pumping capacity of the water pump 21 is changed, the heat of the refrigerant discharged from the compressor 11 (point a4 in FIG. 4) is released to the cooling water (from point a4 to point b4 in FIG. 4), as shown in the Mollier diagram of FIG. 4. Therefore, it is possible to suppress temperature decrease of the cooling water flowing out of the water-refrigerant heat exchanger 12. That is, the blown air can be heated.

Furthermore, the pumping capacity is changed within a range where the outlet-side refrigerant temperature TD2 of the refrigerant flowing out of the water-refrigerant heat exchanger 12 is equal to or higher than the reference refrigerant temperature KTH. Therefore, it is possible to dissipate the heat of the refrigerant (point c4 in FIG. 4) flowing into the outside heat exchanger 14 (from point c4 to point d4 in FIG. 4) by the outside heat exchanger 14, and it is possible to achieve defrosting of the outside heat exchanger 14.

Figure 7:
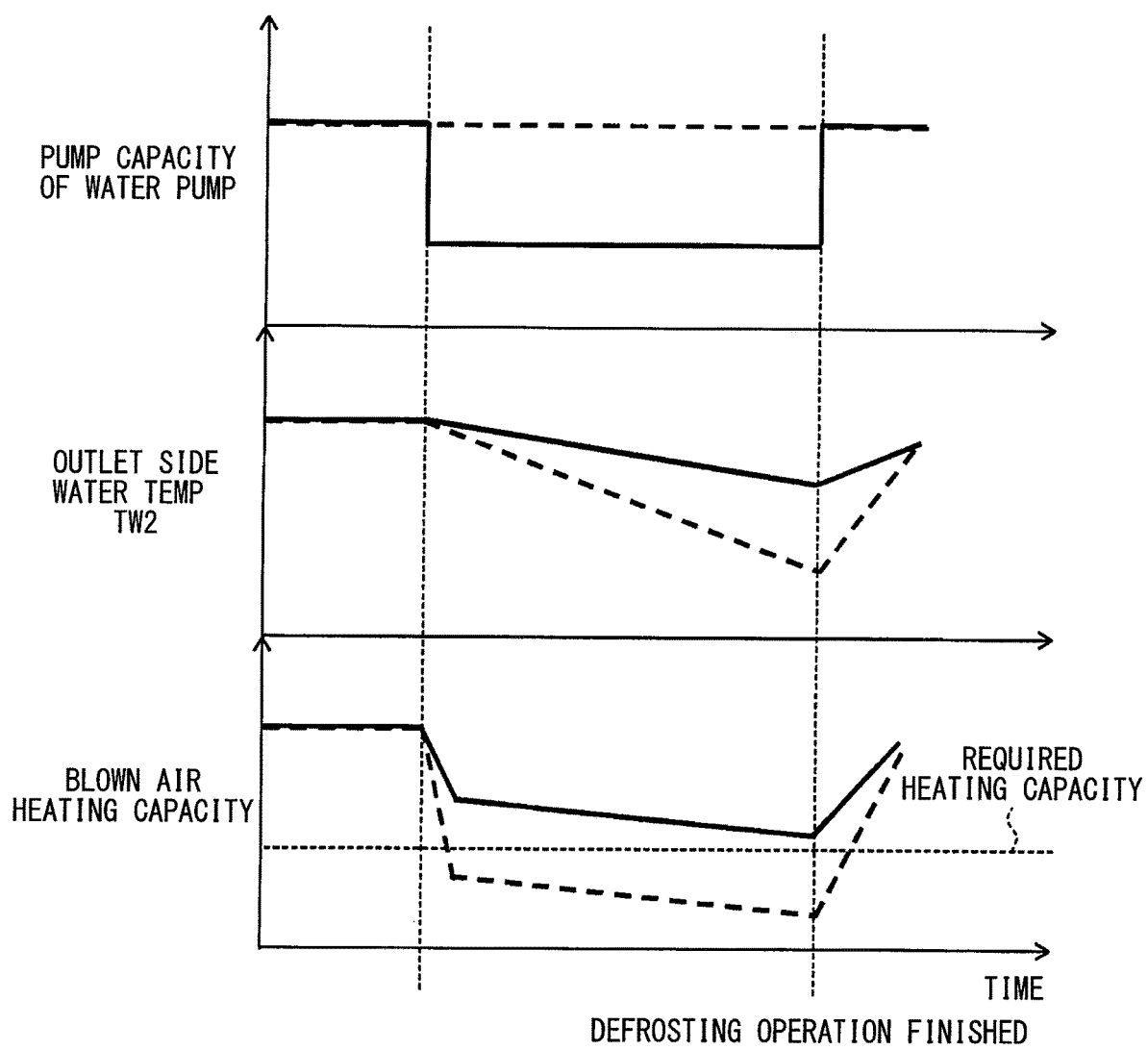
FIG. 7 is a time chart illustrating a temporal change in the heating capacity and the like during the defrosting operation of the heat pump system of the first embodiment.

As a result, in the defrosting operation of the heat pump system 1 of the present embodiment, as shown in a time chart of FIG. 7, it is possible to suppress the deterioration of the heating capacity for the target fluid while exhibiting stable defrosting capacity.

In FIG. 7, the change in the flow rate (that is, the pumping capacity) of the water pump 21 in the heat pump system 1 of this embodiment, the change in the outlet side water temperature TW2, and the change in the heating capacity of the heater core 22 for heating the blown air are shown by thick solid lines. The change in the flow rate of the water pump in the heat pump system 1 of the comparative example, the change in the outlet side water temperature TW2, and the change in the heating capacity for the blown air are indicated by thick broken lines.

That is, if the flow rate of the water pump 21 is not changed during the defrosting operation as in the comparative example shown by the thick broken line in FIG. 7, the amount of decrease in the outlet side water temperature TW2 during the defrosting operation may increase. Therefore, there is a possibility that the heating capability (that is, the heating capacity) for heating the blown air in the heater core 22 is lower than the required heating capability.

In contrast, as shown by the thick solid line in FIG. 7, in the heat pump system 1 of the present embodiment, the flow rate of the water pump 21 is changed during the defrosting operation, so that the decrease in the outlet side water temperature TW2 during the defrosting operation can be suppressed. Accordingly, it is possible to prevent the heating capacity of the heater core 22 for the blown air from decreasing below the required heating capacity, and it is possible to prevent the warming feeling of the occupant from deteriorating greatly.

That is, according to the heat pump system 1 of the present embodiment, it is possible to suppress the deterioration of the heating capacity for the target fluid (the blown air in the present embodiment) while exhibiting stable defrosting capacity in the defrosting operation.

Further, according to the heat pump system 1 of the present embodiment, it is not necessary to drive the engine 60 that is the heating portion to secure the heat energy for defrosting and heating of the vehicle compartment in the defrosting operation. Therefore, it is possible to suppress unnecessary energy consumption and to improve vehicle fuel economy.

Furthermore, the pumping capacity control unit 40c of the heat pump system 1 of the present embodiment changes the pumping capacity within a range where the outlet-side refrigerant temperature TD2 is equal to or higher than the reference refrigerant temperature KTH. Therefore, stable defrosting ability can be exhibited more reliably during the defrosting operation.

In the present embodiment, the example in which the outside air temperature Tam and the outlet side water temperature TW2 are compared in the control step S3 has been described, but the outside air temperature Tam and another cooling water temperature may be compared. For example, instead of the outlet side water temperature TW2, the inlet side water temperature TW1 detected by the first water temperature sensor 44a may be adopted.

Second Embodiment

Figure 8:
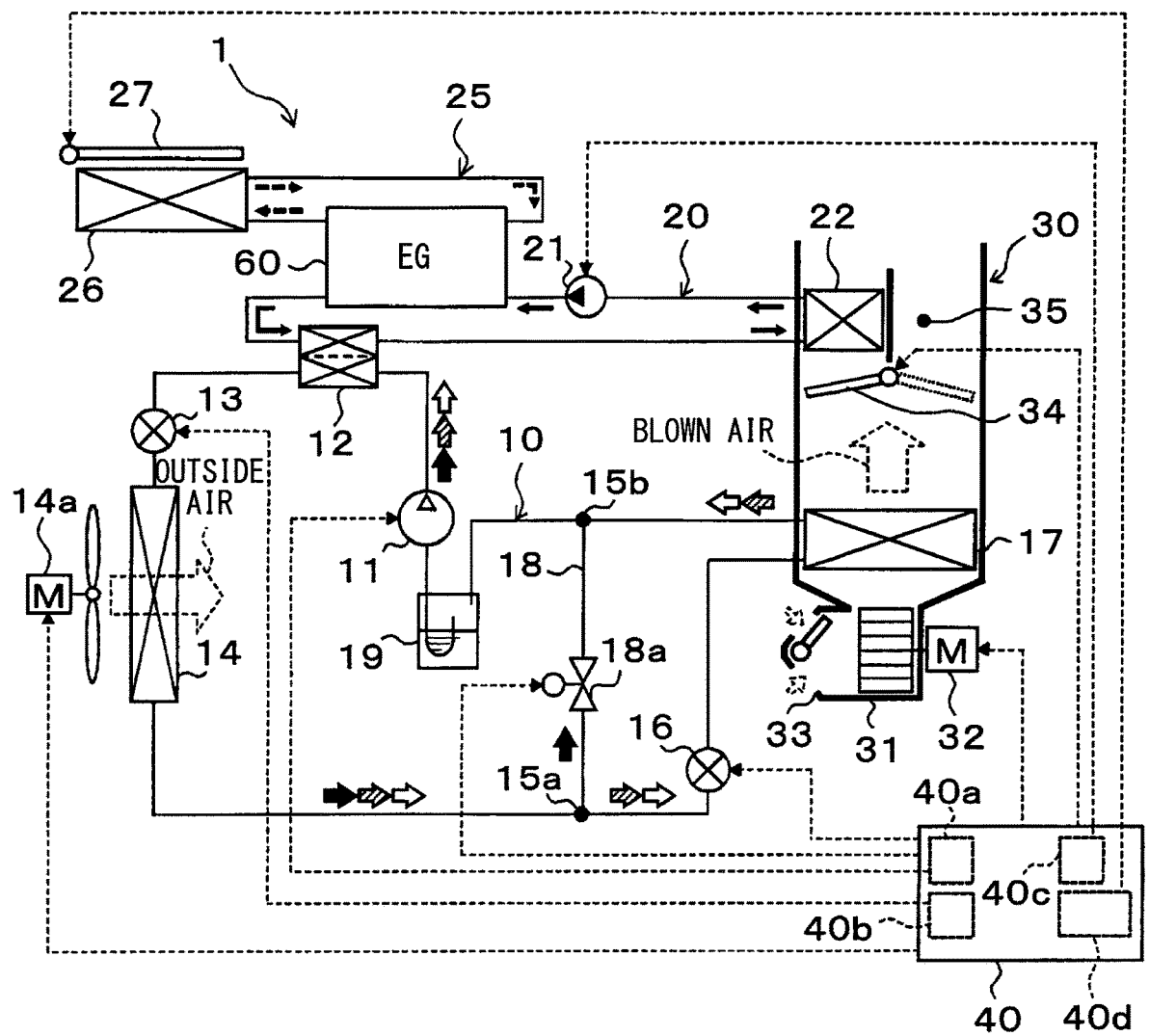
FIG. 8 is a schematic diagram illustrating an overall structure of a heat pump system of a second embodiment.

In the present embodiment, as shown in the overall configuration diagram of FIG. 8, an example in which a shutter 27 is added to the first embodiment will be described. In FIG. 8, the same reference numerals are assigned to the same or equivalent portions as those of the first embodiment. This also applies to the following drawings.

The shutter 27 opens and closes an inflow path of the outside air flowing into the radiator 26. As the shutter 27, one having multiple cantilevered plate doors and a servomotor for driving the plate doors can be adopted. The operation of the shutter 27 is controlled by a control signal output from the air-conditioning controller 40. Therefore, in the air-conditioning controller 40 of the present embodiment, the configuration for controlling the operation of the shutter 27 constitutes a heat radiation capacity control unit 40d.

The radiator 26 exchanges heat between the cooling water and the outside air to dissipate heat of the cooling water. Therefore, when the shutter 27 opens the inflow path of the outside air, the cooling water is cooled by the radiator 26. In contrast, when the shutter 27 closes the inflow path of the outside air, the cooling water is not cooled by the radiator 26.

Accordingly, the radiator 26 and the shutter 27 constitute a temperature adjuster for adjusting the temperature of the cooling water flowing into the water-refrigerant heat exchanger 12. The remaining structures of the heat pump system 1 are the same as the first embodiment.

Next, the operation of the heat pump system 1 of the present embodiment will be described. In the present embodiment, the heat dissipation capacity control unit 40d of the air-conditioning controller 40 controls the operation of the shutter 27 so as to open the inflow path of the outside air during the cooling operation, the dehumidifying-heating operation, and the heating operation. During the defrosting operation, the heat dissipation capacity control unit 40d of the air-conditioning controller 40 controls the operation of the shutter 27 so as to close the inflow path of the outside air.

The remaining operations of the heat pump system 1 are the same as the first embodiment. Therefore, in the cooling operation, the dehumidifying-heating operation, and the heating operation of the heat pump system 1 of the present embodiment, it is possible to perform the cooling, the dehumidifying-heating, and the heating in the vehicle compartment as in the first embodiment.

Further, since the shutter 27 closes the inflow path of the outside air during the defrosting operation, it is possible to suppress the heat radiation of the cooling water in the radiator 26 and to increase the temperature of the cooling water flowing into the water-refrigerant heat exchanger 12. Therefore, during the defrosting operation, it is easy to absorb the heat necessary for defrosting and the heat necessary for heating the vehicle compartment from the cooling water.

Consequently, according to the heat pump system 1 of the present embodiment, the defrosting capacity and the heating capacity for heating the heating target fluid (blown air in this embodiment) do not become insufficient during the defrosting operation, and it is possible to further stabilize the defrosting capacity and to limit decrease of the heating capacity for the heating target fluid.

Third Embodiment

Figure 9:
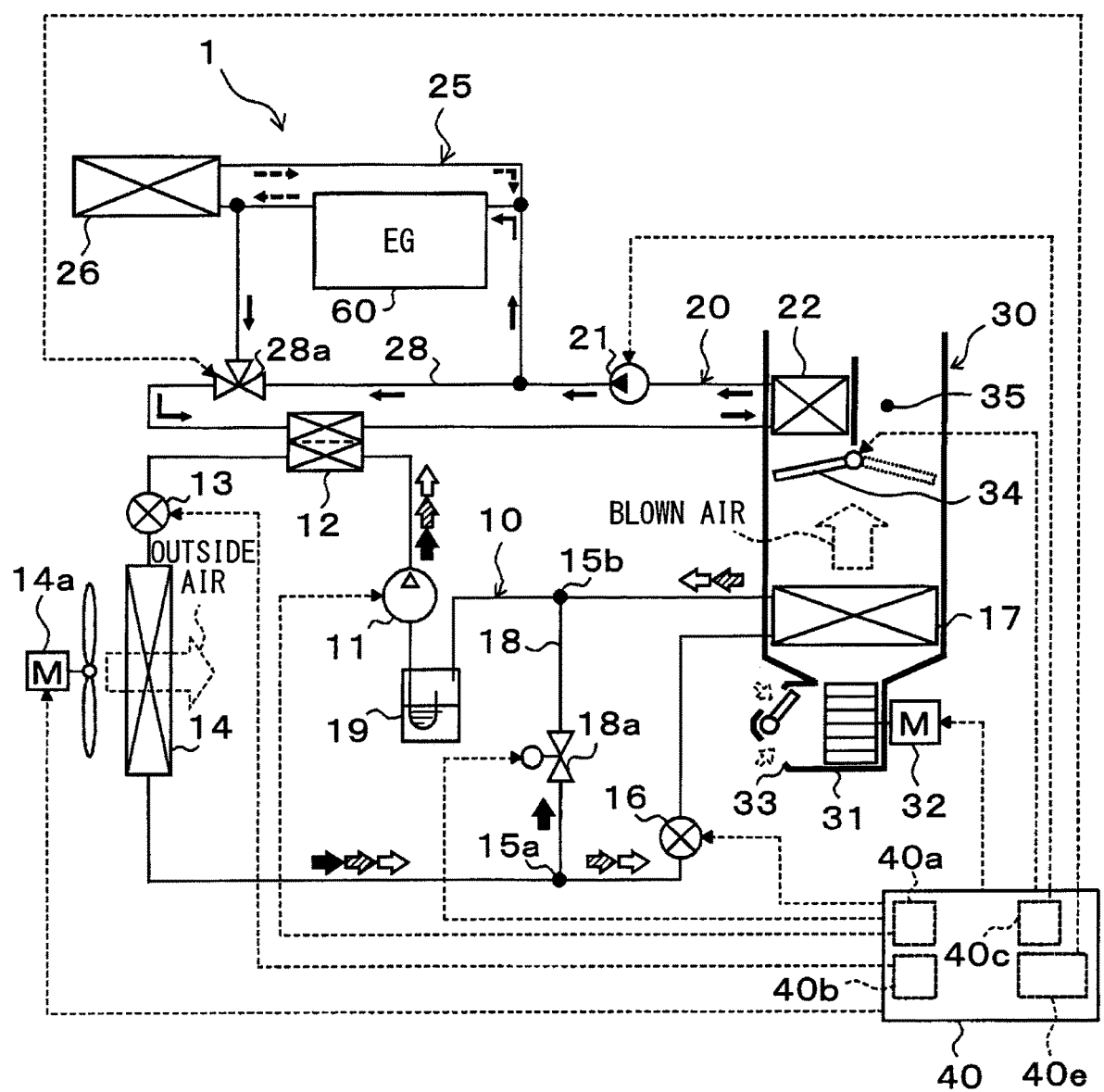
FIG. 9 is a schematic diagram illustrating an overall structure of a heat pump system of a third embodiment.

In the present embodiment, as shown in the overall configuration diagram of FIG. 9, an example in which a water bypass passage 28 and three-way valve 28a are added to the first embodiment will be described.

The water bypass passage 28 is a cooling water pipe that guides the cooling water pumped from the water pump 21 to the three-way valve 28 to bypass the engine 60.

The three-way valve 28a is disposed on the outlet side of the water bypass passage 28. The three-way valve 28a is an electric three-way valve that switches between a heat medium circuit for guiding the cooling water flowing out of the water bypass passage 28 to the water passage inlet side of the water-refrigerant heat exchanger 12 and a heat medium circuit for guiding the cooling water circulating in the heat dissipation circulation circuit 25 to the water passage inlet side of the water-refrigerant heat exchanger 12.

The operation of the three-way valve 28a is controlled by a control voltage output from the air-conditioning controller 40. Therefore, in the air-conditioning control device 40 of the present embodiment, the configuration for controlling the operation of the three-way valve 28a constitutes a heat medium circuit control unit 40e.

Here, when the three-way valve 28a switches to the heat medium circuit that leads the cooling water circulating in the heat dissipation circulation circuit 25 to the water passage inlet side of the water-refrigerant heat exchanger 12, the cooling water circulating in the heat medium circulation circuit 20 is heated by the engine 60. In contrast, when the three-way valve 28a switches to the heat medium circuit that leads the cooling water flowing into the water bypass passage 28 to the water passage inlet side of the water-refrigerant heat exchanger 12, the cooling water circulating in the heat medium circulation circuit 20 is not heated by the engine 60.

Accordingly, the three-way valve 28a of the present embodiment constitutes a temperature adjuster for adjusting the temperature of the cooling water flowing into the water-refrigerant heat exchanger 12. The remaining structures of the heat pump system 1 are the same as the first embodiment.

Next, the operation of the heat pump system 1 of the present embodiment will be described. In the present embodiment, during the cooling operation, the dehumidifying-heating operation, and the heating operation, the heat medium circuit control unit 40e of the air-conditioning control device 40 controls the operation of the three-way valve 28a such that the cooling water flowing into the water bypass passage 28 is guided to the water passage inlet side of the water-refrigerant heat exchanger 12 in the heat medium circuit.

During the defrosting operation, the heat medium circuit control unit 40e of the air-conditioning control device 40 controls the operation of the three-way valve 28a such that the cooling water circulating in the heat dissipation circulation circuit 25 is guided to the water passage inlet side of the water-refrigerant heat exchanger 12 in the heat medium circuit.

The remaining operations of the heat pump system 1 are the same as the first embodiment. Therefore, in the cooling operation, the dehumidifying-heating operation, and the heating operation of the heat pump system 1 of the present embodiment, it is possible to perform the cooling, the dehumidifying-heating, and the heating in the vehicle compartment as in the first embodiment.

In the defrosting operation, since the three-way valve 28a switches to the heat medium circuit that leads the cooling water circulating in the heat dissipation circulation circuit 25 to the water passage inlet side of the water-refrigerant heat exchanger 12, the cooling water heated by the engine 60 flows into the water-refrigerant heat exchanger 12. Therefore, during the defrosting operation, it is easy to absorb the heat necessary for defrosting and the heat necessary for heating the vehicle compartment from the cooling water.

Consequently, according to the heat pump system 1 of the present embodiment, the defrosting capacity and the heating capacity for heating the heating target fluid (blown air in this embodiment) do not become insufficient during the defrosting operation, and it is possible to further stabilize the defrosting capacity and to limit decrease of the heating capacity for the heating target fluid.

Fourth Embodiment

Figure 10:
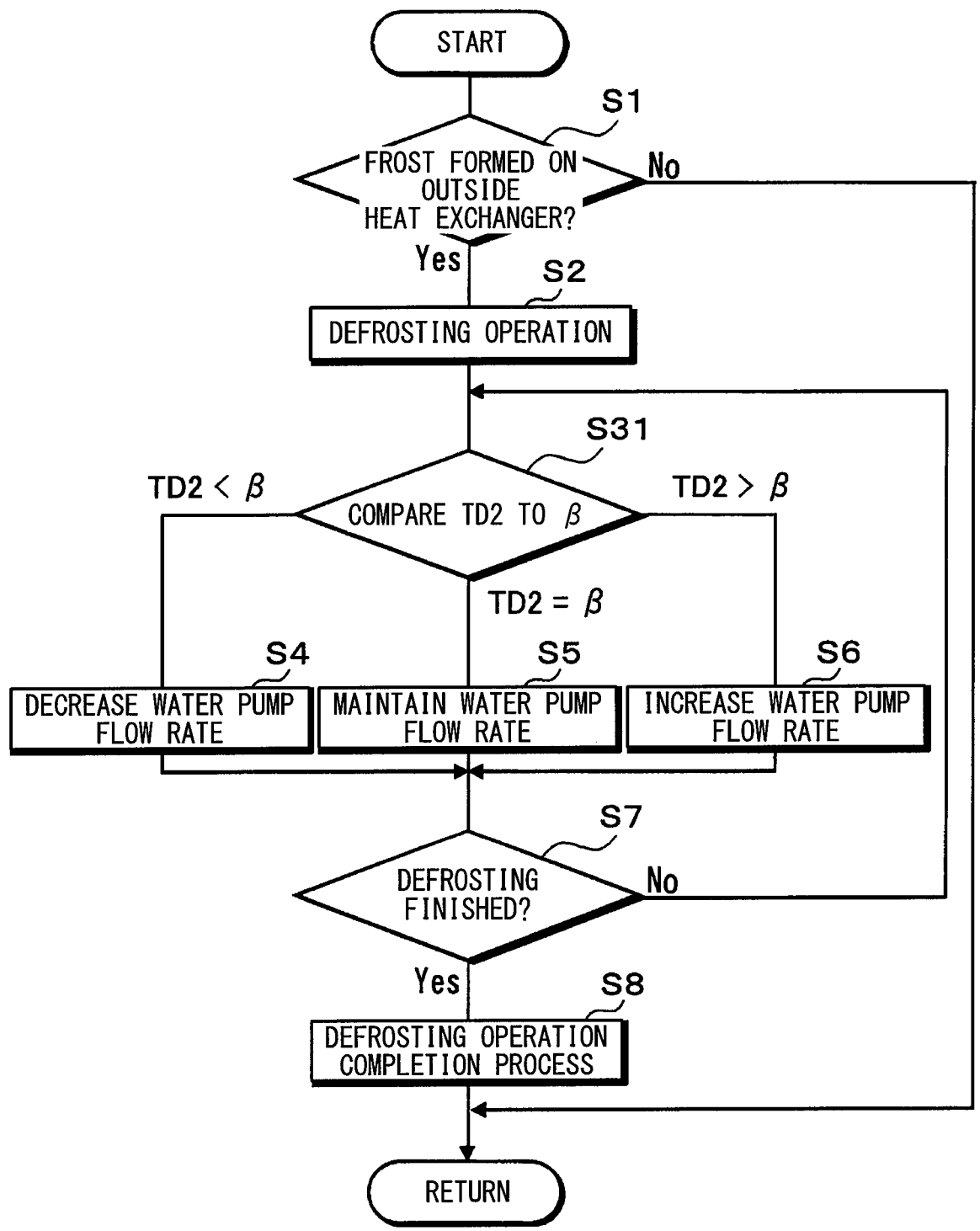
FIG. 10 is a flowchart illustrating a control process of the heat pump system of a fourth embodiment.

In the present embodiment, an example in which the control mode in the defrosting operation is changed from the first embodiment will be described. Specifically, in the present embodiment, the control step S3 described in the first embodiment is changed to the control step S31 as shown in the flowchart of FIG. 10.

In this step S31, the outlet side refrigerant temperature TD2 detected by the second refrigerant temperature sensor 45b is compared with a predetermined second reference temperature β (50 degrees Celsius in the present embodiment). The second reference temperature β is a value determined experimentally as a temperature of the refrigerant flowing into the outside heat exchanger 14, at which defrosting of the outside heat exchanger 14 can be reliably performed.

In step S31, when it is determined that the outlet side refrigerant temperature TD2 is lower than the second reference temperature β, the process proceeds to step S4. In step S4, the pumping capacity control unit 40c of the air-conditioning controller 40 decreases the flow rate of the water pump 21 by a predetermined amount, and the process proceeds to step S7.

In step S31, when it is determined that the outlet side refrigerant temperature TD2 is equal to the second reference temperature β, the process proceeds to step S5. In step S5, the pumping capacity control unit 40c maintains the flow rate of the water pump 21, and the process proceeds to step S7.

In step S31, when it is determined that the outlet side refrigerant temperature TD2 is higher than the second reference temperature β, the process proceeds to step S6. In step S6, the pumping capacity control unit 40c increases the flow rate of the water pump 21 by a predetermined amount, and the process proceeds to step S7.

It is noted that the step S31 is not limited to one in which it is determined that TD2 is equal to β when the actual outlet side refrigerant temperature TD2 and the second reference temperature β are completely the same. Since there are detection errors and the like in each temperature detecting unit, one which judges that TD2 is equal to β when the difference (absolute value) between TD2 and β is equal to or smaller than a predetermined minute value may be adopted.

Here, in steps S31 to S6, the pumping capacity of the water pump 21 is increased with increase of TD2 in step by step manner. Further, in the vehicle air-conditioner, the outlet side refrigerant temperature TD2 is increased in order to increase the temperature of the blown air and to increase the temperature of the cooling water flowing into the heater core 22. Accordingly, the required heating capacity required for the heat pump system 1 (that is, the required heating capacity required to heat the blown air) to heat the vehicle compartment increases with increase of the outlet side refrigerant temperature TD2.

Therefore, during the defrosting operation, the pumping capacity control unit 40c of the present embodiment increases the pumping capacity of the water pump 21 with increase of the required heating capacity. More specifically, in the defrosting operation, the pumping capacity control unit 40c determines that the required heating capacity increases with increase of TD2, and the pumping capacity control unit 40c increases the pumping capacity of the water pump 21. The remaining operations are the same as the first embodiment.

Therefore, in the cooling operation, the dehumidifying-heating operation, and the heating operation of the heat pump system 1 of the present embodiment, it is possible to perform the cooling, the dehumidifying-heating, and the heating in the vehicle compartment as in the first embodiment.

In the defrosting operation, the pumping capacity control unit 40c of the air-conditioning controller 40 increases the pumping capacity of the water pump 21 with increase of the outlet side refrigerant temperature TD2. Therefore, according to the heat pump system 1 of the present embodiment, it is possible to suppress the deterioration of the heating capacity for the target fluid while exhibiting stable defrosting capacity in the defrosting operation, as in the first embodiment.

Fifth Embodiment

Figure 11:
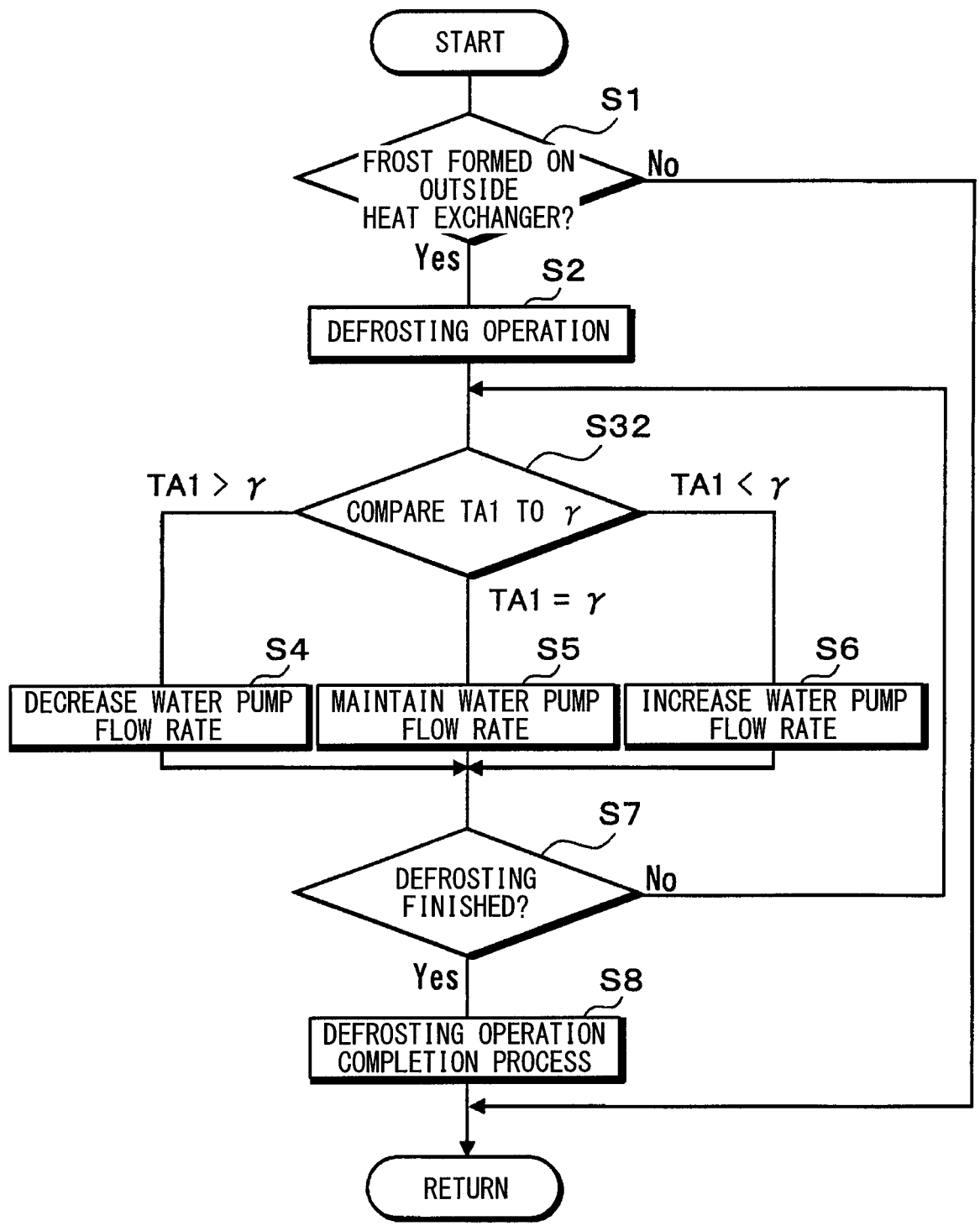
FIG. 11 is a flowchart illustrating a control process of the heat pump system of a fifth embodiment.

In the present embodiment, an example in which the control mode in the defrosting operation is changed from the first embodiment will be described. Specifically, in the present embodiment, the control step S3 described in the first embodiment is changed to the control step S32 as shown in the flowchart of FIG. 11.

In this step S32, the inflow air temperature TA1 detected by the inflow air temperature sensor 49 is compared with a predetermined third reference temperature γ (50 degrees Celsius in the present embodiment).

In step S32, when it is determined that the inflow air temperature TA1 is higher than the third reference temperature γ, the process proceeds to step S4. In step S4, the pumping capacity control unit 40c of the air-conditioning controller 40 decreases the flow rate of the water pump 21 by a predetermined amount, and the process proceeds to step S7.

In step S32, when it is determined that the inflow air temperature TA1 is equal to the third reference temperature γ, the process proceeds to step S5. In step S5, the pumping capacity control unit 40c maintains the flow rate of the water pump 21, and the process proceeds to step S7.

In step S32, when it is determined that the inflow air temperature TA1 is lower than the third reference temperature γ, the process proceeds to step S6. In step S6, the pumping capacity control unit 40c increases the flow rate of the water pump 21 by a predetermined amount, and the process proceeds to step S7.

It is noted that the step S32 is not limited to one in which it is determined that TA1 is equal to γ when the actual inflow air temperature TA1 and the third reference temperature γ are completely the same. Since there are detection errors and the like in each temperature detecting unit, one which judges that TA1 is equal to γ when the difference (absolute value) between TA2 and γ is equal to or smaller than a predetermined minute value may be adopted.

Here, in steps S31 to S6, the pumping capacity of the water pump 21 is increased with decrease of TA1 in step by step manner. Further, in the vehicle air-conditioner, the required heating capacity of the heat pump system 1 for heating the vehicle compartment increases with decrease of the inflow air temperature TA1 in the heating operation or the dehumidifying-heating operation.

Therefore, during the defrosting operation, the pumping capacity control unit 40c of the present embodiment increases the pumping capacity of the water pump 21 with increase of the required heating capacity. More specifically, in the defrosting operation, the pumping capacity control unit 40c determines that the required heating capacity increases with decrease of TA1, and the pumping capacity control unit 40c increases the pumping capacity of the water pump 21. The remaining operations are the same as the first embodiment.

Therefore, in the cooling operation, the dehumidifying-heating operation, and the heating operation of the heat pump system 1 of the present embodiment, it is possible to perform the cooling, the dehumidifying-heating, and the heating in the vehicle compartment as in the first embodiment.

In the defrosting operation, the pumping capacity control unit 40c of the air-conditioning controller 40 increases the pumping capacity of the water pump 21 with decrease of the inflow air temperature TA1. Therefore, according to the heat pump system 1 of the present embodiment, it is possible to suppress the deterioration of the heating capacity for the target fluid while exhibiting stable defrosting capacity in the defrosting operation, as in the first embodiment.

The present disclosure is not limited to the above embodiment and can be modified in various manners as described below without departing from the gist of the present disclosure.

The above embodiments describe an example in which the heat pump system 1 of the present disclosure is applied to a vehicle air-conditioner of a hybrid vehicle. However, the application of the heat pump system 1 is not limited thereto. For example, the vehicular air-conditioning device 1 may be applied to an electric vehicle (including a fuel cell vehicle) which obtains the driving force from a vehicular traveling electric motor to travel or a common vehicle which obtains the driving force for vehicle traveling from an engine.

Furthermore, the heat pump system 1 according to the present disclosure is not limited to a vehicular air-conditioner, and may be applied to a stationary air conditioner, a cold storage store, a hot water supply unit, and the like. Therefore, the air-conditioning controller 40 may be a refrigeration cycle device.

In the above-described embodiments, an example in which the engine cooling water is adopted as a heat medium has been described, but the heat medium is not limited thereto. For example, cooling water for cooling an inverter that supplies electric power to the traveling electric motor may be used. In this case, the inverter serves as a heating unit for heating the heating medium.

Further, other electric devices, electric heaters or the like may be adopted as the heating unit. Further, as the heating unit, a tank for maintaining and storing a high-temperature heat medium may be adopted. During the defrosting operation, the high-temperature heat medium stored in the tank may flow into the heat medium circulation circuit. In the heat pump system according to the present disclosure, the heating unit is not indispensable.

In the above-described embodiments, an example in which the pumping capacity controller 40c of the air-conditioning controller 40 increases, in step by step manner, the pumping capacity of the water pump 21 with increase of the required heating capacity has been described, but of course, the pumping capacity may be continuously increased. In this case, for example, the pumping capacity of the water pump 21 can be determined based on the temperature difference (TW2−Tam), the outlet side refrigerant temperature TD2, the inflow air temperature TA1, etc. with reference to the control map stored in advance in the air-conditioning controller 40.

In the heat pump cycle 10 of the above-described embodiments, the discharge capacity control unit 40a may control the operation of the compressor 11 such that, in the defrosting operation, the temperature of the refrigerant flowing into the water-refrigerant heat exchanger 12 (that is, the inlet side refrigerant temperature TD1) is at or below the predetermined reference temperature KTL. According to this, the temperature of the refrigerant discharged from the compressor 11 is not excessively increased during the defrosting operation, and unnecessary energy consumption can be suppressed.

In the above-described embodiments, an example in which the heat pump cycle 10 configured to switch the refrigerant circuit is adopted is described, but the heat pump cycle is not limited thereto. Any heat pump cycle may be acceptable as long as it can constitute at least a cycle in which the refrigerant flows in the same order as the heating operation of the above-described embodiments.

In addition, various components of the heat pump cycle 10 are not limited to those disclosed in the above-described embodiments.

For example, in the above-described embodiments, an example where an electric compressor is adopted as the compressor 11 of the heat pump cycle 10 is described. However, the compressor 11 is not limited to this. For example, an engine driven compressor driven by a rotational driving force transmitted from an internal combustion engine (engine) via a pulley, a belt or the like may be adopted as the compressor.

Further, as an engine-driven compressor, a variable displacement compressor capable of adjusting the refrigerant discharge capacity by a change in discharge capacity, a fixed capacity compressor capable of adjusting the refrigerant discharge capacity by intermittence of an electromagnetic clutch or the like can be adopted.

In the above-described embodiments, an example where R134a is adopted as the refrigerant of the heat pump cycle 10 is described. However, the refrigerant is not limited to this. For example, HFO-based refrigerants (R1234yf, HFO-1234ze, HFO-1234zd), R600a, R410A, R404A, R32, R407C, and the like can be adopted. Alternatively, a mixed refrigerant obtained by mixing some of these refrigerants may be adopted.

Furthermore, carbon dioxide may be adopted as the refrigerant, and a heat pump cycle constituting a supercritical refrigeration cycle in which a high-pressure side refrigerant pressure of the refrigerant is equal to or higher than the critical pressure may be adopted.

In the above-described embodiments, an example in which the second refrigerant temperature sensor 45b detects the temperature of the refrigerant on the outlet side of the heating expansion valve 13 and on the inlet side of the outside heat exchanger 14 is described. However, the second refrigerant temperature sensor 45b is not limited to this.

For example, the second refrigerant temperature sensor 45b may detect the temperature of the refrigerant immediately after flowing into the outside heat exchanger 14. The second refrigerant temperature sensor 45b may detect the temperature of the refrigerant on the inlet side of the heating expansion valve 13. In this case, the temperature of the refrigerant flowing into the outside heat exchanger 14 may be estimated based on the throttle opening degree of the heating expansion valve 13 and the detection value of the second refrigerant temperature sensor 45b. The temperature of the refrigerant flowing into the outside heat exchanger 14 may be estimated based on a temperature of the refrigerant flowing through a refrigerant passage between the discharge port of the compressor 11 and the water-refrigerant heat exchanger 12, the amount of heat dissipated in the water-refrigerant heat exchanger 12, and the throttle opening degree of the heating expansion valve 13.

The means disclosed in each of the above-described embodiments may be appropriately combined within a range that can be implemented. For example, in the heat pump system 1 described in the second and third embodiments, the control mode in the defrosting operation of the fourth and fifth embodiments may be applied.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A heat pump system comprising:
  a heat pump cycle that includes
    a compressor configured to compress and discharge refrigerant,
    a first heat exchanger configured to exchange heat between high-pressure refrigerant discharged from the compressor and heat medium,
    a decompressor configured to decompress the refrigerant flowing out of the first heat exchanger, and
    an outside heat exchanger configured to exchange heat between low-pressure refrigerant decompressed by the decompressor and outside air;
  a heat medium circulation circuit that includes
    a pump configured to pump the heat medium, and
    a second heat exchanger configured to heat heating target fluid by exchanging heat between the heat medium flowing out of the first heat exchanger and the heating target fluid; and
  a processor, wherein
  the processor is programmed to:
    control an opening degree of the decompressor;
    control a pumping capacity of the pump;
    determine whether frost is formed on the outside heat exchanger;
    perform a defrosting operation to defrost the outside heat exchanger when frost is formed on the outside heat exchanger;
    increase the opening degree in the defrosting operation;
    increase the pumping capacity in the defrosting operation with increase of a required heating capacity required for heating the heating target fluid such that heat of the refrigerant discharged from the compressor is transferred to the heat medium in the first heat exchanger within a range in which a temperature of the refrigerant flowing into the outside heat exchanger is capable of melting the frost formed on the outside heat exchanger; and
    increase the pumping capacity in the defrosting operation with increase of an outlet side refrigerant temperature of the refrigerant flowing out of the first heat exchanger.

2. The heat pump system according to claim 1, wherein the processor is programmed to adjust the pumping capacity in the defrosting operation such that an outlet side refrigerant temperature of the refrigerant flowing out of the first heat exchanger is at or above a predetermined reference refrigerant temperature.

3. A heat pump system comprising:
  a heat pump cycle that includes
    a compressor configured to compress and discharge refrigerant,
    a first heat exchanger configured to exchange heat between high-pressure refrigerant discharged from the compressor and heat medium,
    a decompressor configured to decompress the refrigerant flowing out of the first heat exchanger, and
    an outside heat exchanger configured to exchange heat between low-pressure refrigerant decompressed by the decompressor and outside air;
  a heat medium circulation circuit that includes
    a pump configured to pump the heat medium, and
    a second heat exchanger configured to heat heating target fluid by exchanging heat between the heat medium flowing out of the first heat exchanger and the heating target fluid; and
  a processor, wherein
  the processor is programmed to:
    control an opening degree of the decompressor;
    control a pumping capacity of the pump;
    determine whether frost is formed on the outside heat exchanger;
    perform a defrosting operation to defrost the outside heat exchanger when frost is formed on the outside heat exchanger;
    increase the opening degree in the defrosting operation;
    increase the pumping capacity in the defrosting operation with increase of a required heating capacity required for heating the heating target fluid such that heat of the refrigerant discharged from the compressor is transferred to the heat medium in the first heat exchanger within a range in which a temperature of the refrigerant flowing into the outside heat exchanger is capable of melting the frost formed on the outside heat exchanger; and increase the pumping capacity in the defrosting operation with increase of a difference between an outside air temperature and a temperature of the heat medium circulating in the heat medium circulation circuit.

4. A heat pump system comprising:

a heat pump cycle that includes
- a compressor configured to compress and discharge refrigerant,
- a first heat exchanger configured to exchange heat between high-pressure refrigerant discharged from the compressor and heat medium,
- a decompressor configured to decompress the refrigerant flowing out of the first heat exchanger, and
- an outside heat exchanger configured to exchange heat between low-pressure refrigerant decompressed by the decompressor and outside air;

a heat medium circulation circuit that includes
- a pump configured to pump the heat medium, and
- a second heat exchanger configured to heat heating target fluid by exchanging heat between the heat medium flowing out of the first heat exchanger and the heating target fluid; and a processor, wherein the processor is programmed to:
- control an opening degree of the decompressor;
- control a pumping capacity of the pump;
- determine whether frost is formed on the outside heat exchanger;
- perform a defrosting operation to defrost the outside heat exchanger when frost is formed on the outside heat exchanger;
- increase the opening degree in the defrosting operation;
- increase the pumping capacity in the defrosting operation with increase of a required heating capacity required for heating the heating target fluid such that heat of the refrigerant discharged from the compressor is transferred to the heat medium in the first heat exchanger within a range in which a temperature of the refrigerant flowing into the outside heat exchanger is capable of melting the frost formed on the outside heat exchanger; and
- increase the pumping capacity in the defrosting operation with decrease of an inflow air temperature of the heating target fluid flowing into the second heat exchanger.

* * * * *